(12) United States Patent
Pusdesris et al.

(10) Patent No.: US 9,471,480 B2
(45) Date of Patent: Oct. 18, 2016

(54) DATA PROCESSING APPARATUS WITH MEMORY RENAME TABLE FOR MAPPING MEMORY ADDRESSES TO REGISTERS

(71) Applicant: The Regents of the University of Michigan, Ann Arbor, MI (US)

(72) Inventors: Joseph Michael Pusdesris, Ann Arbor, MI (US); Yiping Kang, Ann Arbor, MI (US); Andrea Pellegrini, Ann Arbor, MI (US); Benjamin Allen Vandersloot, Ann Arbor, MI (US); Trevor Nigel Mudge, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 430 days.

(21) Appl. No.: 14/186,257

(22) Filed: Feb. 21, 2014

(65) Prior Publication Data

US 2015/0154106 A1    Jun. 4, 2015

Related U.S. Application Data

(63) Continuation-in-part of application No. 14/093,634, filed on Dec. 2, 2013, now abandoned.

(51) Int. Cl.
*G06F 12/02* (2006.01)
*G06F 9/38* (2006.01)
*G06F 9/30* (2006.01)

(52) U.S. Cl.
CPC ......... *G06F 12/023* (2013.01); *G06F 9/30043* (2013.01); *G06F 9/384* (2013.01); *G06F 9/3826* (2013.01)

(58) Field of Classification Search
None
See application file for complete search history.

(56) References Cited

U.S. PATENT DOCUMENTS 5,867,725 A * 2/1999 Fung ................. G06F 9/3842
712/23
7,043,626 B1    5/2006 McMinn et al.
(Continued)

FOREIGN PATENT DOCUMENTS

WO    WO 2005/111794    11/2005

OTHER PUBLICATIONS

Invitation to Pay Additional Fees and Communication Relating to the Results of the Partial International Search dated Mar. 13, 2015 in PCT/US2014/060878, 8 pages.
(Continued)

*Primary Examiner* — Edward Dudek, Jr.
*Assistant Examiner* — Christopher D Birkhimer
(74) *Attorney, Agent, or Firm* — Nixon & Vanderhye P.C.

(57) ABSTRACT

A data processing apparatus has a memory rename table for storing memory rename entries each identifying a mapping between a memory address of a location in memory and a mapped register of a plurality of registers. The mapped register is identified by a register number. In response to a store instruction, the store target memory address of the store instruction is mapped to a store destination register and so the data value is stored to the store destination register instead of memory. A memory rename entry is provided in the table to identify the mapping between the store target memory address and store destination target register. In response to a load instruction, if there is a hit in the memory rename table for the load target memory address then the loaded value can be read from the mapped register instead of memory.

36 Claims, 11 Drawing Sheets

(56) References Cited

U.S. PATENT DOCUMENTS

| | | | |
|---|---|---|---|
| 7,206,923 B2* | 4/2007 | Eichenberger | G06F 9/30076 712/217 |
| 7,461,238 B2* | 12/2008 | Luick | G06F 9/3853 712/216 |
| 7,730,283 B2* | 6/2010 | Luick | G06F 9/3853 712/216 |
| 8,423,716 B2* | 4/2013 | LaTorre | G06F 1/32 711/100 |
| 8,499,293 B1* | 7/2013 | Ashcraft | G06F 8/441 717/151 |
| 2004/0015904 A1 | 1/2004 | Jourdan et al. | |
| 2004/0034678 A1 | 2/2004 | Kuszmaul et al. | |
| 2005/0149702 A1 | 7/2005 | Hily et al. | |
| 2007/0050602 A1 | 3/2007 | Lien et al. | |
| 2007/0130448 A1* | 6/2007 | Jourdan | G06F 9/30043 712/218 |
| 2008/0114966 A1 | 5/2008 | Begon | |
| 2008/0148022 A1 | 6/2008 | Piry et al. | |
| 2011/0271056 A1* | 11/2011 | LaTorre | G06F 1/32 711/119 |
| 2013/0151819 A1 | 6/2013 | Piry et al. | |
| 2014/0095814 A1 | 4/2014 | Marden et al. | |

OTHER PUBLICATIONS

B. Heggy et al, "Architectural Support for Register Allocation in the Presence of Aliasing" Proceedings of the Supercomputing Conference, IEEE Comp. Soc., Nov. 1990, pp. 730-739.

D.W. Oehmke et al, "How to Fake 1000 Registers" Proceedings of the 38th Annual IEEE/ACM International Symposium on Microarchitecture, MICRO-38, Nov. 2005, 12 pages.

S. Onder et al, "Load and Store Reuse Using Register File Contents" Proceedings of the 15th International Conference on Supercomputing, ACM, 2001, pp. 289-302.

G.S. Tyson et al, "Improving the Accuracy and Performance of Memory Communication Through Renaming" IEEE, Proceedings, Thirtieth Annual IEEE/ACM International Symposium on Microarchitecture, Dec. 1997, pp. 1-10.

H.W. Cain et al, "Memory Ordering: A Value-Based Approach" Proceedings, 31st Annual International Symposium on Computer Architecture, IEEE, 2004, 12 pages.

S. Jourdan et al, "A Novel Renaming Scheme to Exploit Value Temporal Locality through Physical Register Reuse and Unification" Proceedings of the 31st Annual ACM/IEEE International Symposium on Microarchitecture, 1998, 10 pages.

A. Moshovos et al, "Streamlining Inter-operation Memory Communication via Data Dependence Prediction" Proceedings of the 30th Annual ACM/IEEE International Symposium on Microarchitecture, Dec. 1997, 11 pages.

I. Park et al, "Reducing Design Complexity of the Load/Store Queue" Proceedings of the 36th Annual IEEE/ACM International Symposium on Microarchitecture, 2003, 12 pages.

A. Roth, "Store Vulnerability Window (SVW): Re-Execution Filtering for Enhanced Load Optimization" ACM SIGARCH Computer Architecture News, vol. 33, No. 2, 2005, 11 pages.

T. Sha et al, "NoSQ: Store-Load Communication without a Store Queue" Proceedings of the 39th Annual IEEE/ACM International Symposium on Microarchitecture, Dec. 2006, 12 pages.

S. Stone et al, "Address-Indexed Memory Disambiguation and Store-to-Load Forwarding" Proceedings of the 38th Annual IEEE/ACM International Symposium on Microarchitecture, Nov. 2005, pp. 171-182.

S. Subramaniam et al, "Fire-and-Forget: Load/Store Scheduling with no Store Queue at All" 39th Annual IEEE/ACM International Symposium on Microarchitecture, MICRO-39, IEEE, 2006, 12 pages.

J. Yang et al, "Energy-Efficient Load and Store Reuse" Proceedings of the 2001 International Symposium on Low Power Electronics and Design, ACM, Aug. 2001, pp. 72-75.

K.M. Lepak et al, "On the Value Locality of Store Instructions" ACM SIGARCH Computer Architecture News, vol. 28, No. 2, Jun. 2000, 10 pages.

L. Baugh et al, "Decomposing the Load-Store Queue by Function for Power Reduction and Scalability" IBM Journal of Research and Development 50.2.3, 2006, 11 pages.

R. Bhargava et al, "Issues in the Design of Store Buffers in Dynamically Scheduled Processors" IEEE International Symposium on Performance Analysis of Systems and Software, 2000, ISPASS, IEEE, 2000, 12 pages.

R.L. Sites, "How to Use 1000 Registers" Caltech Conference on VLSI, Jan. 1979, pp. 527-532.

M. Postiff et al, "The Store-Load Address Table and Speculative Register Promotion" Proceedings of the 33rd Annual ACM/IEEE International Symposium on Microarchitecture, ACM, 2000, pp. 1-10.

M. Postiff et al, "The Need for Large Register Files in Integer Codes" Michigan Univ Ann Arbor Dept of Electrical Engineering and Computer Science, 2000, pp. 1-28.

H.S. Lee et al, "Stack Value File: Custom Microarchitecture for the Stack" Proceedings of the 7th IEEE International Symposium on High Performance Computer Architecture (HPCA-7), 2001, pp. 1-10.

D.R. Ditzel, "Register Allocation for Free: The C Machine Stack Cache" ACM SIGPLAN Notices, vol. 17, No. 4, ACM, 1982. pp. 48-56.

H. Dietz et al, "CRegs: A New Kind of Memory for Referencing Arrays and Pointers" Proceedings of the 1988 ACM/IEEE Conference on Supercomputing, 1988, pp. 360-367.

S. Sethumadhavan et al, "Scalable Hardware Memory Disambiguation for high ILP Processors" 38th Annual International Symposium on Microarchitecture, 2003, pp. 1-12.

E.F. Torres et al, "Store Buffer Design in First-Level Multibanked Data Caches" Proceedings of the 32nd International Symposium on Computer Architecture (ISCA'05), 2005, 12 pages.

P. Racunas et al, "Partitioned First-Level Cache Design for Clustered Microarchitectures" Proceedings of the 17th Annual International Conference on Supercomputing, ACM, 2003, 10 pages.

M. Islam et al, "A Unified Approach to Eliminate Memory Accesses Early" CASES'11, Oct. 2011, Chalmers University of Technology, 10 pages.

International Search Report and Written Opinion of the International Searching Authority mailed Sep. 28, 2015 in PCT/US2014/060878, 15 pages.

* cited by examiner

```
ADD  r0, r1, r2
LD   r4, [ #add ]
STR  r5, [ #add ]
```

| | Dispatch | Issue | Execute | MRT | R0 | R1 | R2 | Writeback | Retire | RMRT |
|---|---|---|---|---|---|---|---|---|---|---|
| 0 | | | | | Free | Free | Free | | | |
| 1 | Load X (A) - alloc R0 | | | | Alloc | Free | Free | | | |
| 2 | | Load X (A) | | | Alloc | Free | Free | | | |
| 3 | Load X (B) - alloc R1 | Load X (A) | | | Alloc | Alloc | Free | | | |
| 4 | | Load X (A), Load X (B) | | | Alloc | Alloc | Free | | | |
| 5 | | Load X (A) | Load X (B) | R1 → X | Alloc | Pending | Free | | | |
| 6 | Load Y (A) - alloc R2 | Load X (A) | Load X (B) | R1 → X | Alloc | Pending | Alloc | | | |
| 7 | Store Y (A) | Load X (A) | | R1 → X | Alloc | Clean | Alloc | | | |
| 8 | Store Y (A) | Load X (A) | | R1 → X | Alloc | Clean | Alloc | Load X (B) | | |
| 9 | Store Y (A) | | Load X (A) | R1 → X | Free | Clean | Alloc | | Load X (B) | R1 → X |
| 10 | Store Y (A) | | | R1 → X | Free | Clean | Alloc | Load X (A) | | R1 → X |
| 11 | Store Y (A) | | | R1 → X | Free | Clean | Alloc | | Load X (A) | R1 → X |
| 12 | | Store Y (A) | | R1 → X | Free | Clean | Alloc | | | R1 → X |
| 13 | | | Store Y (A) | R2 → Y | Alloc | Clean | Spec | | | R1 → X |
| 14 | Store Y (B) - alloc R0 | | Store Y (A) | R2 → Y | Alloc | Clean | Spec | | | R1 → X |
| 15 | | Store Y (B) | Store Y (A) | R2 → Y | Alloc | Clean | Spec | | | R1 → X |
| 16 | | | Store Y (A), (B) | R0 → Y | Spec | Clean | Spec | | | R1 → X |
| 17 | | | Store Y (B) | R0 → Y | Spec | Free | Dirty | | Store Y (A) | R2 → Y |
| 18 | | | | R0 → Y | Dirty | Free | Free | | Store Y (B) | R0 → Y |
| 19 | Load X (C) - alloc R1 | | | R0 → Y | Dirty | Alloc | Free | | | R0 → Y |
| 20 | | Load X (C) | | R0 → Y | Dirty | Alloc | Free | | | R0 → Y |
| 21 | | | Load X (C) | R1 → X | Clean | Pending | Free | Load X (C) | | R0 → Y |
| 22 | | | | | Clean | Clean | Free | | | R0 → Y |
| 23 | | | | | Free | Clean | Free | | Load X (C) | R1 → X |

FIG. 16

|  | Low | Medium | High |
|---|---|---|---|
| Width | 2 | 3 | 4 |
| Frequency | 1.0 GHz | 1.7 GHz | 2.5 GHz |
| Rob Size | 40 | 112 | 192 |
| Issue Queue Entries | 16 | 32 | 60 |
| Store Buffer Entries | 8 | 16 | 42 |
| Physical Registers | 58 | 130 | 168 |
| LSU Load-to-use | 3 cycles | 3 cycles | 3 cycles |
| L1 Size | 32k | 32k | 32k |
| L1 Ports | 1 read/write | 1 read/write | 2 read/write |
| L1 Load-to-use | 4 cycles | 4 cycles | 4 cycles |
| L2 Size | 1M | 1M | 4M |
| L2 Load-to-use | 17 cycles | 17 cycles | 17 cycles |
FIG. 18
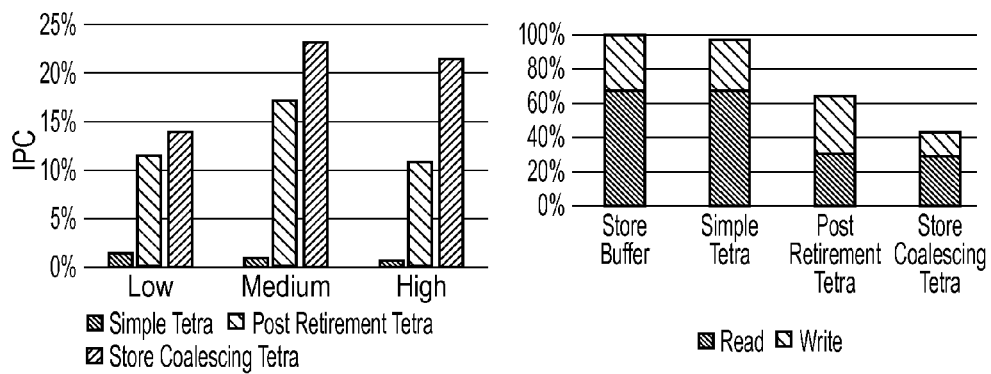
FIG. 19
FIG. 20
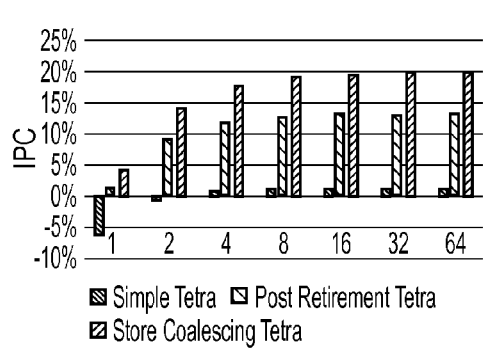
FIG. 21
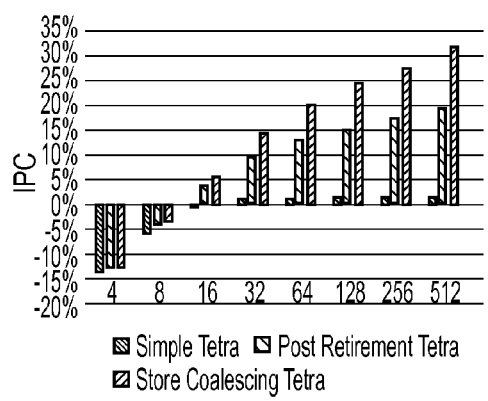
FIG. 22

DATA PROCESSING APPARATUS WITH MEMORY RENAME TABLE FOR MAPPING MEMORY ADDRESSES TO REGISTERS

This is a continuation-in-part application of U.S. patent application Ser. No. 14/093,634 filed on 2 Dec. 2013, the contents of which are entirely incorporated herein by reference.

TECHNICAL FIELD

The present technique relates to the field of data processing. More particularly, it relates to a processing apparatus having a memory rename table for mapping memory addresses to registers.

TECHNICAL BACKGROUND

To cope with the high cost of memory access, modern architectures provide a large number of general purpose registers. These registers offer a dense set of short term storage within the CPU to avoid accessing memory. Unfortunately, short term values cannot always take advantage of these registers. There are situations known to cause this behavior, for example: register pressure causes values to be spilled and filled from memory, registers must be demoted across function calls, and compilers are not able to disambiguate pointers and conservatively keep the values in memory to guarantee correctness. While a variety of techniques to reduce these restrictions have been proposed, they have not seen widespread adoption. This is likely because of the required changes to the programming interface. The most common architectural approach used in modern out-of-order processors is not to prevent the situations listed above, but instead to speed up the short term spills via a sophisticated load-store-unit (LSU) in conjunction with a high bandwidth L1 cache.

Besides serving as a device for high speed memory access, the LSU is also used as storage for speculative data. Stores cannot commit to memory until they become known valid architectural state, typically at the head of the reorder buffer. While effective, many LSU designs are considerably expensive, featuring comparator matrices, storage registers, ordering logic, scheduling logic, and requiring the L1 cache to be multi-ported with low latency. Many of these components share similar functionality to the point of redundancy with other pipeline components. An example of this redundancy is the storage of a single value being potentially duplicated in the register file, LSU, cache, and main memory. Another example is the ordering of memory operations being maintained by both the reorder buffer and the LSU.

The present technique seeks to address these issues.

SUMMARY OF THE PRESENT TECHNIQUE

Viewed from one aspect, the present technique provides a data processing apparatus comprising:

processing circuitry configured to perform data processing;

a plurality of registers configured to store data for processing by the processing circuitry; and a memory rename table configured to store a plurality of memory rename entries, each memory rename entry identifying a mapping between a memory address of a location in a memory and a mapped register of said plurality of registers, the memory rename entry specifying a register number identifying the mapped register;

wherein the processing circuitry is configured, in response to a store instruction specifying a store target memory address, to store a data value to a store destination register, and to provide a memory rename entry in said memory rename table identifying a mapping between said store target memory address and the store destination register; and the processing circuitry is configured, in response to a load instruction specifying a load target memory address, to detect whether the memory rename table comprises a corresponding memory rename entry corresponding to said load target memory address, and if the memory rename table comprises the corresponding memory rename entry, to read a data value from the mapped register identified by the corresponding memory rename entry, write the read data value to a load destination register.

The present technique provides a memory rename table which stores a number of memory rename entries. Each memory rename entry identifies a mapping between a memory address of a location in memory and a mapped register of the registers of the processing apparatus. The memory rename entry identifies the register using a register number. In response to a store instruction, which would normally cause a data value to be stored to memory, the store target memory address is instead mapped to a store destination register and a memory rename entry in the rename table is provided to identify the mapping between the store target memory address and the store destination register. If, on executing a subsequent load instruction, the load target memory address of the load instruction has a corresponding memory rename entry in the memory rename table, then the load can read the data value from the mapped register identified by the corresponding memory rename entry, rather than loading the value from memory. This speeds up processor performance and reduces energy consumption. This approach is simpler and more scalable to larger designs than previous approaches which aim to speed up the load/store operations to memory. The memory rename table can be scaled for use with any number of registers because each memory rename entry identifies the register using a register number, rather than having a fixed mapping between a memory rename entry and a corresponding register. The memory rename table may also help with improving performance for load-to-load forwarding. On a subsequent load, if the memory rename table comprises a corresponding memory rename entry for its load target memory address then the data value can be read from the mapped register instead of memory, to speed up processing.

Following one load instruction, the memory rename entry corresponding to the load target memory address may be updated to identify the mapping between the load target memory address and the load destination register into which the loaded value is placed. Alternatively, the previous memory rename entry for the load target memory address may be retained.

On the other hand, if the memory rename table does not comprise a corresponding memory rename entry for the load target memory address of a load instruction, then the data value can be loaded from a location in memory identified by the load target memory address. The loaded data value is then written to the load destination register and a memory rename entry is allocated in the memory rename table for identifying a mapping between the load target memory address and the load destination register.

For a store instruction, the processing circuitry may also detect whether the memory rename table comprises a corresponding memory rename entry. If there is a memory rename entry corresponding to the store target address then this entry can be updated to identify the mapping between the store target memory address and the store destination register for the store instruction, while if the memory rename table does not comprise a corresponding memory rename entry then a new entry can be allocated for identifying the mapping between the store target address and the store destination register.

Hence, for all store instructions and all load instructions, an access to the memory rename table may be made to check whether there is a corresponding memory rename entry, and if there is not one already then a new memory rename entry can be allocated. Hence, all load or store instructions have their target address mapped to a register, to increase the likelihood that later load instructions will have their target data resident in the registers. This contrast to some previous approaches which try to speculatively predict which particular load-store pairs or load-load pairs will use the same data, and then store data from selected addresses in a buffer for use by the second instruction of the pair. However, it can be hard to predict the memory addresses for load or store instructions in advance and so this approach may not capture all the pairs of instructions for which it would be useful to store a local copy of data. The present technique provides a simpler approach in which the memory rename table is used to map the target addresses of all recent loads and store instructions onto the register file without a speculative prediction of which pairs of instructions are likely to have the same address.

In some examples, the registers mapped to addresses by the memory rename table may be the same registers that are accessed by the processor in response to register specifiers specified by instructions. Hence, there may be a single register file including registers which can either be mapped to an address for memory renaming for a load/store instruction, or be used as a general purpose register by the processor.

In other examples, the plurality of registers which can be mapped to addresses by the memory rename table may be separate from the general purpose registers used by the processor in response to instructions which specify a register specifier. For example, the general purpose registers may be provided in a separate register file from the plurality of registers used by the memory rename table, or the memory renaming registers and the general purpose registers may be different subsets of a single register file. Separating the registers which can be mapped to memory addresses from the general purpose registers can make management of the registers easier since it is not necessary to track, when mapping a register to a particular memory address, whether that register has already been allocated for general purpose processing using a register specifier, and vice versa.

The processing circuitry may have a register renaming stage which maps architectural register specifiers specified by an instruction to be processed to the register number of one of the registers of the processing apparatus. In known systems, a register renaming stage would only allocate a physical register for an instruction specifying a destination register, such as a load instruction which will specify a load destination register or an arithmetic instruction (e.g. add, multiply) which will specify a destination register for storing the result of the arithmetic operation. Store instructions would not normally have a physical register allocated by the register renaming stage in previous systems, because store instructions do not specify a destination register. However, unusually the present technique may augment the register renaming stage to also allocate a register as a store destination register for the store instruction. The store target address can then be mapped to the store destination register, and the value which would normally be stored to memory can instead be stored in the store destination register. This allows the value to remain in the register file so that subsequent load instructions targeting the same address can be processed more quickly.

The register renaming stage may maintain a register rename table having a number of register rename entries which each identify a mapping between an architectural register specifier and the register number of one of the registers. The memory rename table is an additional table, provided in addition to the register rename table, which tracks translations between memory addresses and registers.

To allow the register renaming stage to track which registers are being used, and which registers are free for allocation to other instructions, each register may have a register bound flag indicating whether the register is currently mapped to an architectural register specifier (that is, whether there is currently a valid entry in the register rename table corresponding to that register). Also, each register may have a memory bound flag indicating whether the register is currently mapped to a memory address using a valid memory rename table entry. When allocating registers for mapping to an architectural register specifier (register renaming) or for mapping to a memory address (memory renaming), the register rename stage may use the register bound flag and memory bound flag to determine which register is available for allocation. In general, the register rename stage may allocate a free register which the register/memory bound flags indicate is not currently bound to either an architectural register specifier or a memory address. If no free registers are available then the pipeline may stall until a register becomes unbound.

In examples where the registers mapped by the memory rename table are separate from the general purpose registers, the register bound flag may not be required, and instead the memory bound flag may be sufficient.

To allow the memory rename table to assist with alleviating the register pressure and other issues discussed in the introduction above, it is useful to provide a greater number of registers than would normally be provided if the present technique was not used. Hence, for an architecture designed for use with a given number of registers, the present technique may be implemented using more registers—e.g. twice or four times as many registers. One may wonder why the rename logic is necessary in this case—would it not be possible to simply increase the number of registers without performing register renaming? However, increasing the number of registers would not be useful unless program code is adapted to use the full range of registers. Legacy code may have been written for fewer registers, and so in anticipation of there not being enough register space for the values required at a given point of the program, the programmer may have used load/store instructions to spill/fill values to memory which cannot fit in the registers. Therefore, even if the number of registers is simply increased, this may not result in a performance improvement because there may still be load/store instructions in the code which would not use the registers unless memory renaming is provided. On the other hand, even if the code is designed for use with the increased number of registers, this would require larger architectural register specifiers in the instruction encoding, which would increase the amount of space required in the instruction cache/memory and the width of the instruction path in the fetch/decode stages of the pipeline in order to accommodate the larger register specifiers. For these reasons, it may be more efficient for the code to continue to be designed for a fewer number of architectural registers, but for a larger number of physical registers to be provided with the memory rename table being used to control mapping of load/store target addresses to registers. This approach also improves compatibility with legacy code.

The present technique may be used in a system in which the processing circuitry may perform speculative execution of at least one instruction. This means that instructions can be executed speculatively before it is known whether the instructions should have been executed. For example, following a branch instruction a prediction can be made as to whether the branch will be taken or not taken and then instructions associated with the predicted path of execution can be executed speculatively before it has been determined whether the branch prediction was correct. In another example, an out-of-order processor may speculatively execute an instruction out of order in order to make use of free capacity on a particular processing unit, before it is known from the result of an earlier instruction whether that instruction should have been executed. Also, data value prediction could be used to predict a value to be used for a speculative execution of an instruction, before the actual data value becomes available. In all of these cases, it may later be determined whether the speculation was correct, and if so, the result of the speculatively executed instruction can be committed. If there was a mis-speculation, then the results of the instructions are not committed and/or state can be rewound to match the last committed state.

The memory rename table may be updated in response to the speculative execution of load or store instructions, that is before the result of the load or store has been committed. Hence, the memory rename table is used to control the execution of the load or store instructions actually being executed by the processing circuitry, but at this stage it may not be known whether that execution is correct. To track the committed instructions, a retirement memory rename table may be provided which stores similar memory rename entries and is updated in a corresponding way to the memory rename table, but at a different point of the execution pipeline where the results of the load or store instruction are committed. Hence, the retirement memory rename table represents the address-to-register mappings for committed load or store instructions while the memory rename table represents the mappings for speculatively executed instructions. If it is determined that the speculative execution of at least one load or store instruction was incorrect, then the processing circuitry can copy at least one memory rename entry from the retirement memory rename table to the memory rename table to rewind the state to the last point at which execution was determined be correct. Similarly, there may be a retirement register rename table storing register rename entries which are updated at the point of the pipeline at which state is committed, and which is used to restore the register rename table to the correct committed values if there is a mis-speculation.

The processing circuitry may prohibit eviction of a memory rename entry corresponding to a speculatively executed load or store instruction until that instruction is committed. If the memory rename entry was evicted from the memory rename table before the corresponding instruction is committed, then a subsequent load instruction would encounter a memory rename table miss and so would assume it needs to load the data value from memory, which may be incorrect if there is a more up to date dirty value in one of the registers which is different from the corresponding value in the memory. By preventing eviction of memory rename entries for speculatively executed instructions, this error can be avoided. On the other hand, the processing circuitry may allow overwrites of memory rename entries with a new register mapping for the same target address, which would not have the same risk of fetching an old value from memory.

Having allocated a memory rename entry in the memory rename table for a particular load or store instruction, then there are a number of policies which can be used to determine when to invalidate the memory rename entry. In general, the longer a memory rename entry can remain valid in the memory rename table, the greater the performance benefits since it is more likely that a subsequent load instruction will hit in the memory rename table so that a load from memory can be avoided. However, policies which allow the memory rename entry to remain valid for longer may be more complex to manage, so a particular policy may be selected depending on the requirements for a particular system, to balance performance improvement against the processing overhead associated with implementing the policy.

In one example of a register management policy, a memory rename entry may be invalidated when the corresponding load or store instruction for which the memory rename entry was allocated to the table is committed. There may be some time between the speculative execution of a load or store instruction and the result of the load or store instruction being committed, especially in an out-of-order processor, since the processor may have to wait for the outcome of a number of earlier instructions before it can be determined whether the speculative execution was correct. As the reuse distance for a given load/store target address tends to be reasonably short, then retaining the memory rename entry in the rename table until committing the corresponding load/store instruction may be sufficient to improve performance. This policy may provide a relatively simple way of determining when to invalidate a memory rename entries.

With this simple management policy, when a load or store instruction is encountered for which there is a memory rename table miss, then an invalid memory rename entry may be allocated for the load or store instruction. If there are no invalid memory rename entries then the processing may be stalled until a memory rename entry becomes invalid. This restriction to only allocate invalid memory rename entries ensures that all speculative values from in flight loads or stores are represented in the memory rename table, rather than evicting a memory rename entry and corresponding register value, which may lead to the corresponding data value later being loaded from memory when it could have been retained within the registers.

The register/memory bound flags discussed above and the load/store target address can be used to track which instruction corresponds to a given memory rename entry. For a destination register corresponding to a load instruction, the register/memory bound flags will indicate that the register is bound to both an architectural register and a memory address, while for a destination register corresponding to a store instruction, only the memory bound flag would be set as the store instruction would not specify an architectural register. Hence, when a load/store instruction retires, it can be checked whether there is a corresponding memory rename entry for the target address of the load/store instruction, and if so then the register/memory bound flags of the register indicated by the memory rename entry can be used to determine whether the entry is associated with a load or a store. If the state of the register/memory bound flags for that register match the type of instruction that is being retired, then it can be determined that the memory rename entry corresponds to the retired instruction.

Alternatively, a post-commit retention policy may be used where the memory rename entry is maintained as valid after the result of the corresponding load/store instruction has been committed. Hence, the data value is kept resident in the register file, so a memory access is avoided if the values are needed again even after the corresponding instruction has retired. The memory rename entry can then be invalidated later on if there are no more invalid memory rename entries and a new memory rename entry needs to be allocated to handle a load or store instruction.

To track this allocation policy, each register may have an associated commit flag which represents whether the result of the corresponding load/store instruction has been committed or not. Hence, in response to the speculative execution of a load/store instruction, the commit flag associated with the load/store destination register is set to a non-committed state, while in response to committing the response of the load or store instruction, the commit flag of the load or store destination is set to a committed state. When encountering a load/store instruction for which there is no corresponding memory rename entry in the rename table, the processing circuitry will attempt to allocate an invalid memory rename entry first, and if there are no valid memory rename entries then the processing circuitry selects a memory rename entry which identifies a register for which the commit flag is in the committed state, and allocates the selected memory rename entry for the load or store instruction. If there are no rename entries associated with a committed register then processing is stalled. This approach improves performance because it increases the lifetime of memory values in the register file. If there are several available memory rename entries corresponding to a register with the commit flag in the committed state, then various selection policies may be used to select which memory rename entry to use. For example, a least recently used (LRU) or pseudo LRU policy may be used for example.

As discussed above, the memory rename table allows a store target memory address to be mapped to a store destination register so that the value stored is placed in the register and a subsequent load instruction using the same value does not need to access memory. Hence, the store instruction need not actually store the data value to memory at the point of execution. However, at some point later on the data value should be written back from the store destination register to memory, to ensure memory consistency so that once the memory rename entry associated with the store instruction has been invalidated then subsequent loads from memory will yield the correct result. There are various writeback policies which can be used to control the timing at which the writeback is performed. Unlike a load, for which there is usually a subsequent instruction which uses the loaded data value, the timing of a store instruction often does not impact the performance of the pipeline as much. Hence, there is flexibility as to when the writeback for the store is performed. In one example, the write back may take place when the store instruction is committed. In another example, the data value from the store destination register may be stored to memory when the corresponding memory rename entry is invalidated or reallocated for use for a different address.

It is possible that, before the data from the store destination register has been written back to memory, a second store instruction may be encountered specifying the same store target memory address as the first store instruction. In this case, to reduce the number of memory accesses, the writeback operations associated with the two store instructions may be coalesced so that only the second store is actually performed with respect to memory. When the memory rename entry corresponding to a store instruction is invalidated or reallocated for a different address, then the writeback of the data value to memory may be inhibited if there is a further store instruction pending which specifies the same store target memory address. For example, a writeback flag may be maintained to track whether there is a further store instruction for the same address. The writeback flag may have a first state which indicates that there is no further store instruction to the same address and so write back should be performed when the corresponding memory rename entry is invalidated, and a second state indicating that there is a further instruction and that the writeback should be inhibited.

With this policy, when a store instruction is encountered, then the writeback flag for the store destination register may be set to the first state to indicate that this is the first store instruction for that address. In response to a store instruction for which there is a corresponding rename entry for the store target address in the memory rename table, the processing circuitry may set to the second state the writeback flag which is associated with the register indicated by the corresponding memory rename entry. This indicates that responsibility for writing back the contents of the store destination register is now passed to the second store instruction, and so it is no longer necessary to write back the value stored in the register previously indicated by the memory rename entry. Meanwhile, the writeback flag associated with the store destination register of the second store will also be set to the first state to indicate that this value should be written back to memory when the corresponding memory rename entry is invalidated.

Also, in response to a load instruction for which there is a corresponding memory rename entry, the writeback flag associated with the load destination register may be set to the same state as the writeback flag which is associated with the mapped register identified by the memory rename entry corresponding to the load target memory address. This ensures that an intervening load instruction will maintain the state of the writeback flag, so that if there was an earlier store instruction then the writeback responsibility of the store instruction is retained in case there is a later store.

The memory rename table may be structured in different ways and may for example have a direct mapped, fully associative or set-associative structure indexed by the memory address. However, it may be more efficient to provide a set-associative structure for the memory rename table. This can reduce the number of locations which have to be indexed using the memory address, while leaving some flexibility for allocation of new memory rename entries. Hence, each memory rename entry may specify a tag portion of the memory address and the physical register number of the mapped register.

Issue circuitry may be provided to control issuing of instructions to the processing circuitry. In general, the instructions to be issued may have a program order as they appear in the program being executed. However, the issue circuitry may issue the instructions in a different order depending on when addresses for instructions are calculated and when the required operands become available.

However, there may be some constraints to ensure correct processing results and to avoid potential deadlocks. For example, load or store instructions may be prevented from being issued ahead of an earlier store instruction in the program order specifying the same target address, to ensure that subsequent instructions using the register mapped to the store target address or subsequent writebacks to the store target address will use the correct value in the mapped register for the second store instruction, not the first store instruction.

Also, if the memory rename table has an associativity of N, then the issue circuitry can allow a store instruction to be issued ahead of no more than N earlier store instructions in the program order. If more than N store instructions pass an earlier store instruction, then there is a risk that all the available memory rename entries which can hold a memory rename entry for a particular target address could be taken, and then the earliest store instruction could not be issued. However, if there is then a subsequent load or store instruction specifying the same target address as the earliest store instruction, then that instruction could also not be issued for the reason given in the previous paragraph. Therefore, a deadlock would arise where several instructions cannot be issued, and this deadlock could remain for some time if the store instructions that were issued are speculatively executed and not committed for some time. Hence, there may be a loss of performance. To avoid this problem, it can be more efficient to prevent store instructions issuing ahead of N earlier store instructions.

It some cases, the issue circuitry may prevent the store instruction issuing ahead of N earlier store instructions, regardless of the addresses specified, which can provide a simple approach which does not require the issue circuitry to examine the index portions of target addresses, simplifying the issue circuitry. However, this may result in instructions being prevented from issuing even if they mapped to different sets of the memory rename table and so would not have caused a deadlock.

In other cases, the issue circuitry may only prevent the store instruction issuing ahead of N earlier store instructions that map to the same set of the memory rename table (that is, earlier store instructions sharing the same index portion of the target address), which prevents the problem discussed above while reducing the number of instructions that are prevented from issuing.

Viewed from another aspect, the present technique provides a data processing apparatus comprising:

processing means for performing data processing;

a plurality of register means for storing data for processing by the processing means; and memory rename table means for storing a plurality of memory rename entries, each memory rename entry identifying a mapping between a memory address of a location in a memory and a mapped register means of said plurality of register means, the memory rename entry specifying a register number identifying the mapped register means;

wherein the processing means is configured, in response to a store instruction specifying a store target memory address, to store a data value to a store destination register means, and to provide a memory rename entry in said memory rename table means identifying a mapping between said store target memory address and the store destination register means; and the processing means is configured, in response to a load instruction specifying a load target memory address, to detect whether the memory rename table means comprises a corresponding memory rename entry corresponding to said load target memory address, and if the memory rename table means comprises the corresponding memory rename entry, to read a data value from the mapped register means identified by the corresponding memory rename entry, write the read data value to a load destination register means.

Viewed from another aspect, the present technique provides a method of processing data using a plurality of registers for storing data and a memory rename table configured to store a plurality of memory rename entries, each memory rename entry identifying a mapping between a memory address of a location in a memory and a mapped register of said plurality of registers, the memory rename entry specifying a register number identifying the mapped register;

the method comprising steps of:

in response to a store instruction specifying a store target memory address, storing a data value to a store destination register, and providing a memory rename entry in said memory rename table identifying a mapping between said store target memory address and the store destination register; and in response to a load instruction specifying a load target memory address, detecting whether the memory rename table comprises a corresponding memory rename entry corresponding to said load target memory address, and if the memory rename table comprises the corresponding memory rename entry, reading a data value from the mapped register identified by the corresponding memory rename entry, writing the read data value to a load destination register.

Further aspects, features and advantages of the present technique will be apparent from the following detailed description of examples, which is to be read in conjunction with the accompanying drawings.

BRIEF DESCRIPTION OF THE DRAWINGS

FIG. 16 is a table showing an example of the allocation of memory rename entries and the management of register state for an example sequence of load and store instructions;

FIG. 18 is a table illustrating three example pipeline configurations used for simulation results; and FIGS. 19 to 24 illustrate simulation results for the present technique.

DETAILED DESCRIPTION OF EXAMPLE EMBODIMENTS

Figures 1, 2:
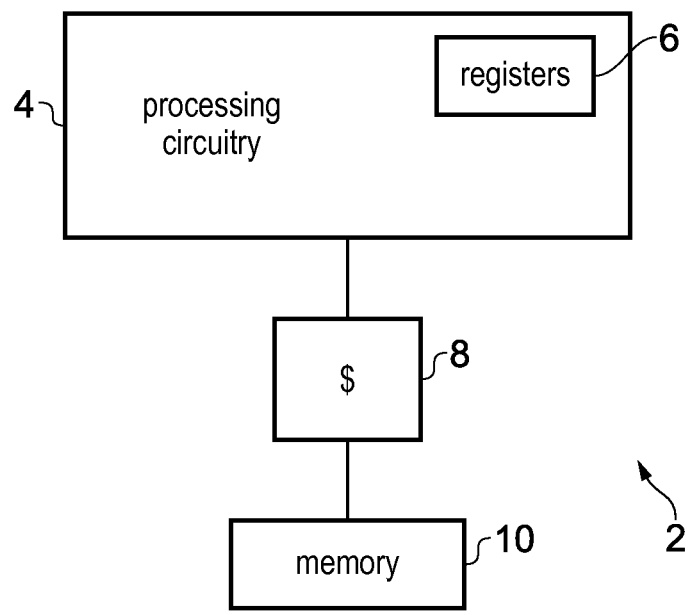
FIG. 1 schematically illustrates a portion of a data processing apparatus.
FIG. 2 illustrates examples of arithmetic, load and store instructions.

FIG. 1 schematically illustrates a portion of a data processing apparatus 2 having processing circuitry 4 for processing data. The processing circuitry 4 is an out-of-order processor which can perform speculative execution of instructions. The processing circuitry 4 has some registers 6 for storing data values to be processed. The apparatus also has a memory system comprising a cache 8 and main memory 10. Data values from memory 10 can be brought into the cache 8 to be accessed more quickly and efficiently. Data values in the registers 6 can be accessed even more quickly than data in the cache 8. In the subsequent description, the cache 8 and main memory 10 will collectively be described as memory. Hence, references to loading or storing values in memory may include loading or storing values in the cache 8 as well as main memory 10. It will be appreciated that the apparatus 2 may have many other elements not illustrated in FIG. 1 for conciseness.

FIG. 2 shows an example of some instructions which can be executed by the processing circuitry 4. For example, the processing circuitry 4 may execute arithmetic instructions, such as the ADD instruction illustrated in FIG. 2. The arithmetic instructions may operate on the values stored in registers (r1, r2 in the example FIG. 2) and may place the result of the arithmetic operation in a destination register r0. To facilitate out-of-order processing and speculative execution, and avoid potential hazards associated with different instructions using the same architectural register specifier to refer to different values, the processing circuitry 4 may support renaming of registers so that the architectural register specifiers specified in the instruction are mapped to physical register numbers (PRNs) identifying the physical registers 6 of the processing circuitry 4. Similarly, for a load instruction LD for loading a data value from an address #add in memory to a destination register r4, the destination register r4 may be mapped to a physical register by the renaming. The instructions also include a store instruction STR for storing a data value from a source register r5 to a location in memory identified by a store target address #add. In typical systems, no register renaming would be required for the store instruction, because it does not specify a destination register and the architectural-to-physical register mapping for the source register r5 would already have been determined for an earlier instruction which generated the value in the register r5. However, the present technique extends renaming so that the load/store target addresses #add of load/store instructions are also renamed to be mapped to a physical register. This means that the data value associated with a load or store target address can be accessed in the register file rather than memory, which can improve the performance and power efficiency of the system.

Figure 3:
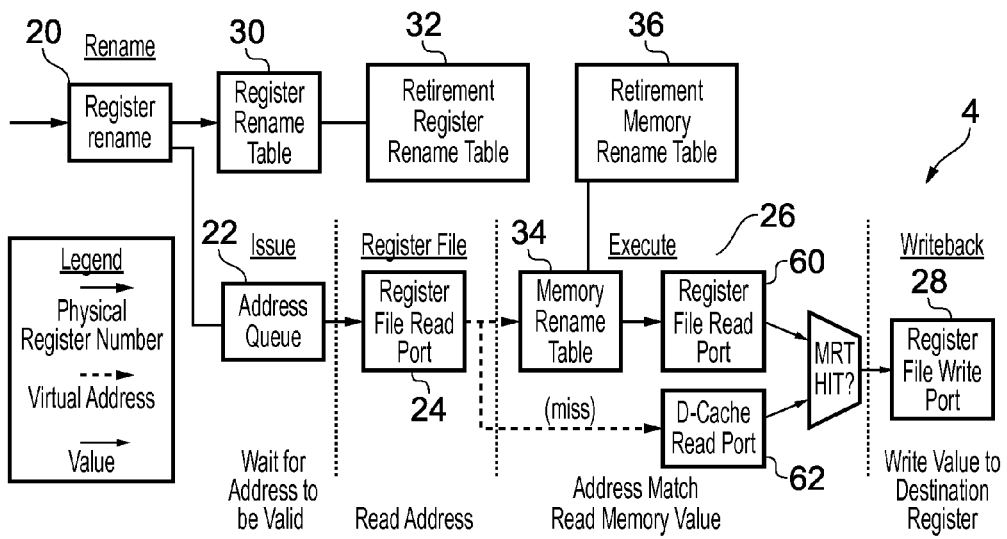
FIG. 3 schematically illustrates a portion of a pipeline of the processing circuitry.
Figure 4:
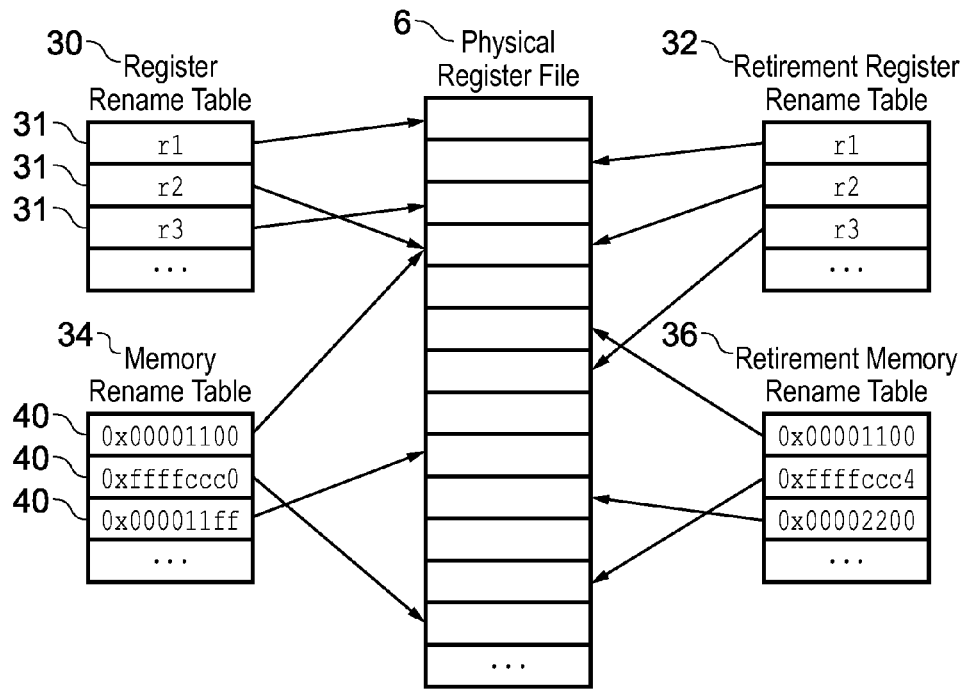
FIG. 4 schematically illustrates mapping of register specifiers and memory addresses to physical registers.

FIG. 3 illustrates an example of a portion of a processing pipeline of the processing circuitry 4 which supports memory renaming as discussed above. The pipeline has a register renaming stage 20, an issue stage 22, a register read stage 24, an execute stage 26, and a register writeback stage 28. The register renaming is carried out using a register rename table (RRT) 30 and a retirement register rename table (RRRT) 32, while the memory renaming is carried out using a memory rename table (MRT) 34 and a retirement rename memory table (RMRT) 36. FIG. 4 shows an example illustrating how these tables map register specifiers or addresses to a physical register file 6. The RRT 30 includes register rename entries 31 which map architectural register specifiers r1, r2, r3 etc. to physical register numbers identifying corresponding registers of the physical register file 6. This allows a greater number of physical registers 6 to be provided than the number of architectural register specifiers which can be specified by instructions, so that architectural references to the same architectural register can be disambiguated and point to different physical registers. Any known register renaming technique may be used to perform the register renaming using the RRT 30.

The MRT 34 includes a number of memory rename entries 40 which each identify a mapping from a memory address (e.g. 0x00001100) to a physical register number identifying a register in the register file 6. The MRT 34 maps to the same register file as the RRT 30. Hence, registers of the physical register file 6 can be mapped to an architectural register specifier using the RRT 30, a memory address using the MRT 34, or both an architectural specifier and a memory address using entries in both tables 30, 34. The RRT 30 and MRT 34 are updated for speculatively executed instructions at the execute stage 26 of the pipeline before the results of those instructions are committed and written back to the register file at the write back stage 28. The RRRT 32 and RMRT 36 store corresponding data to the RRT 30 and MRT 34 respectively, but are updated at the writeback stage 28 when the results of instructions are committed once it is known that the speculative execution was correct. Otherwise, the retirement tables 32, 36 are updated in the same way as the RRT 30 and MRT 34.

Figure 5:
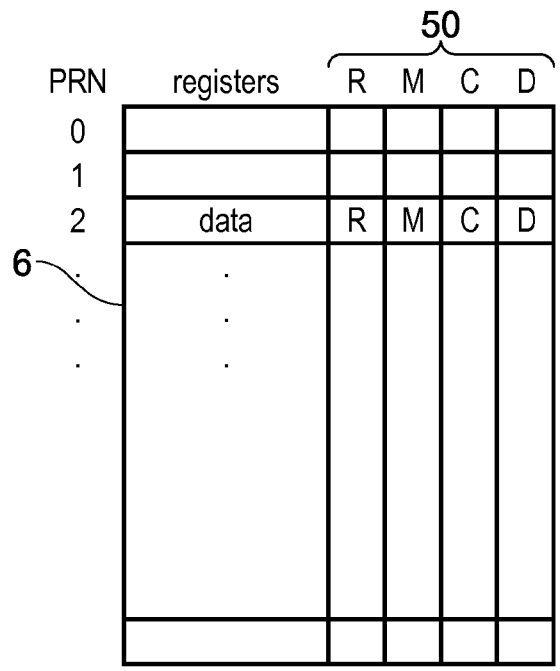
FIG. 5 illustrates an example of control information associated with each register.

FIG. 5 illustrates an example of the physical register file 6. Each register has associated control information 50 which is used by the register rename stage 20 to control allocation of registers and by the execute stage 26 to control allocation of MRT entries. Each register has a register bound flag R which represents whether the register is currently bound to an architectural register specifier using an entry of the RRT 30. Similarly, the register has a memory bound flag M indicating whether the register is currently bound to a memory address using an entry of the MRT 34. Optionally, each register may also have a committed flag C and a writeback flag (or dirty flag) D. The C and D flags are not required for all embodiments and so may be omitted. The commit flag C indicates whether the instruction which stored the data in the register has been committed yet, and the write back flag D indicates whether the value stored in the register is a store target value which needs to be written back to memory. The use of these flags will be discussed in more detail below with respect to FIGS. 10 to 12.

Figure 6:
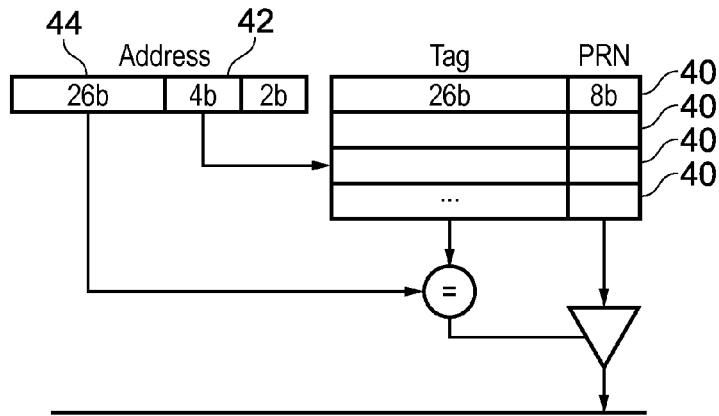
FIGS. 6 and 7 illustrate examples of the structure of the memory rename table.
Figure 7:
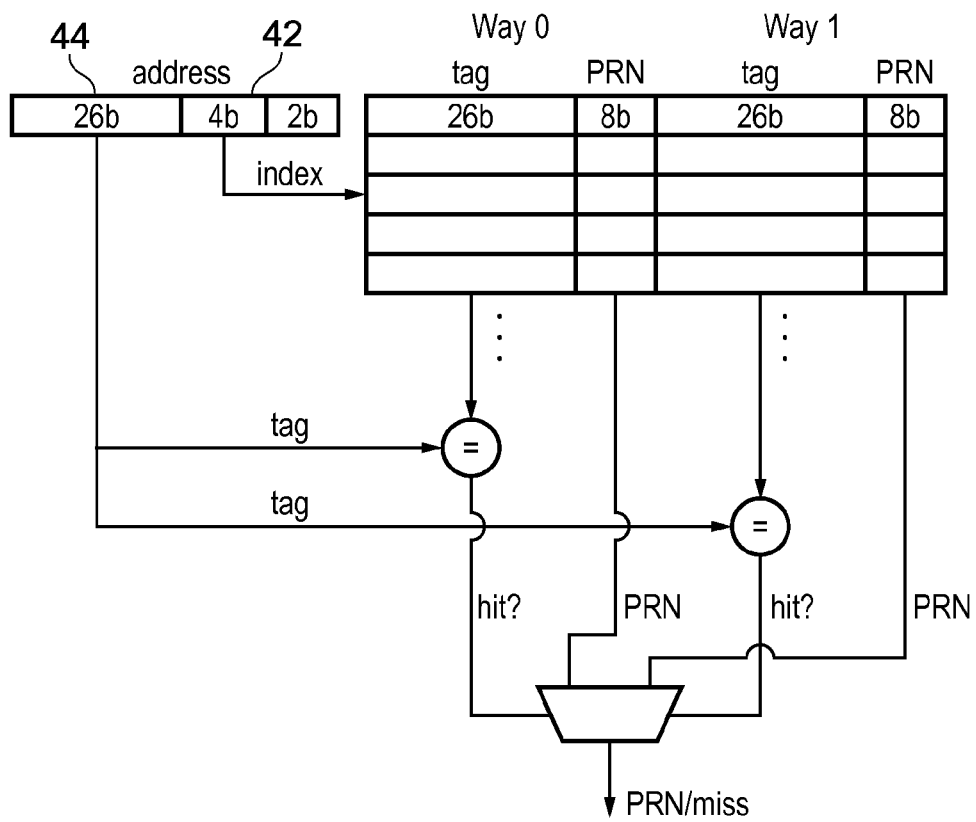

FIGS. 6 and 7 show two examples of the structure of the MRT 34. As shown in FIG. 6, each memory rename entry 40 may specify a tag portion (Tag) of a memory address and a physical register number (PRN) of a corresponding mapped register. In response to a load/store target address, an index portion 42 of the target address is used to index into a corresponding entry of the MRT 34 and then the tag portion 44 of the address is compared against the tag value stored in the indexed entry to determine whether there is a hit or a miss in the MRT 34. If there is a hit, then the physical register number from the indexed entry is output.

FIG. 7 shows a similar example with an N-way set associative structure (with associativity N equal to 2 in this example). In this case, the index portion 42 of the load/store target address indexes into a set of N entries within the MRT 34, and the tag portion 44 of the target address is compared against the tag values stored in each of the indexed set of entries. If one of the indexed set of entries has a matching tag, then there is an MRT hit and the corresponding physical register number PR of that entry is output, while if none of the set of entries has a matching tag then an MRT miss is identified.

Figure 8:
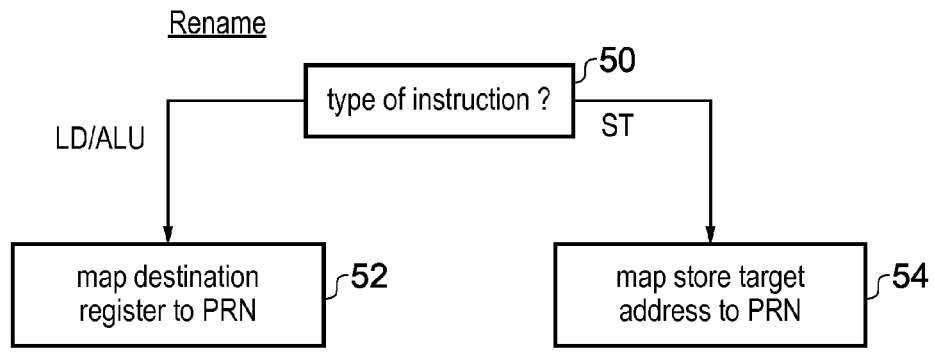
FIG. 8 illustrates a method of allocating a physical register at a register renaming stage.

Returning to FIG. 3, the operation of the pipeline will now be described. Instructions which have been fetched from memory and decoded are supplied to the register rename stage 20 for register renaming. FIG. 8 illustrates a method of operation of the register rename stage 20. At step 50, the register rename stage 20 detects the type of instruction being processed. If the instruction is a load instruction or an arithmetic (ALU) instruction then the architectural register specifier identifying the destination register for the instruction is mapped to a free physical register identified by a physical register number PRN. The register rename stage 20 selects a free register which the register bound flag R and memory bound flag M indicate as not being bound to either an architectural register specifier or a memory address. A register rename entry in the RRT 30 is then allocated to represent the new mapping. It is not necessary to allocate new registers for any source registers used by the instruction because the mapping of the architectural register specifiers to the physical registers for source registers will already have been established for a previous instruction using the source register as its destination register and so a mapping will already be resident in the RRT 30.

On the other hand, if at step 50 it is determined that the current instruction is a store instruction, then at step 54 the store target memory address specified by the store instruction is mapped to a physical register number PRN. Again, a physical register having the memory bound flag M and register bound flag R in the unbound states is selected (in the present application, the bound stages of the flags are represented using M, R respectively, while the unbound states will be represented as $\overline{M}$, $\overline{R}$, with the bar indicating "not" memory bound or not register bound). Although a physical register is allocated to the store instruction, at this stage the MRT 34 is not updated. The MRT 34 will be accessed at the execute stage 26 and so by deferring allocation of an MRT entry for the store instruction then the number of table accesses can be reduced. Instead, the physical register number is retained for the store instruction for use at the execute stage 26.

The instructions then proceed to the issue stage 22. The issue stage 22 has an address queue for queuing instructions while the target address for the instruction is being determined, which may depend on the outcome of an earlier instruction. When the address for an instruction becomes available then it can be issued. In one example, the issue stage 22 may only allow memory operations to issue in their original program order. However, relaxations to this approach can also be made if desired provided they are supported by the desired consistency model. One such example may allow some loads to pass other loads instructions which are earlier in the program order but issued later. To prevent a deadlock being caused by there being insufficient available memory rename entries in the set-associative MRT 34, one constraint may require that the issue stage 22 ensures that the number of reordered loads which pass ahead of other loads mapping to the same set of the MRT (i.e. loads having load target addresses with the same index portion 42) is controlled so that it does not exceed the associativity of the MRT. For example, if the MRT is 2-way set associative and 2 loads are issued before the leading load, then a deadlock can result as the leading load may not be able to allocate an MRT entry until the other in-flight loads commit. These loads will never commit as they are later in program order. Logic can be added to the address queue to check for this case or a policy which allows non-committed load results to be evicted from the MRT could be designed to prevent this deadlock. A second common approach to relaxing memory operation ordering is to speculatively issue without any ordering constraint and rollback on violation. A violation can be detected by verifying a match between the MRT entry seen at execute and the RMRT entry at retire.

When the instruction has been issued then it is passed to the register read stage 24, which reads any source values required for the instruction from the physical register file 6 using the corresponding architectural-to-physical register mappings in the RRT 30. Register reads are required at least for arithmetic and store instructions.

The instruction is then passed to the execute stage 26. The arithmetic instructions may be processed in any known manner, and so this is not described in detail here. The execute stage 26 includes the MRT 34, a register file read port 60 for reading control information 50 from the register file 6 and a memory (cache) read port 62 for reading data from the memory system (including the cache). The result of the instruction is written to the register file 6 (committed) at the writeback stage 8.

Figure 9:
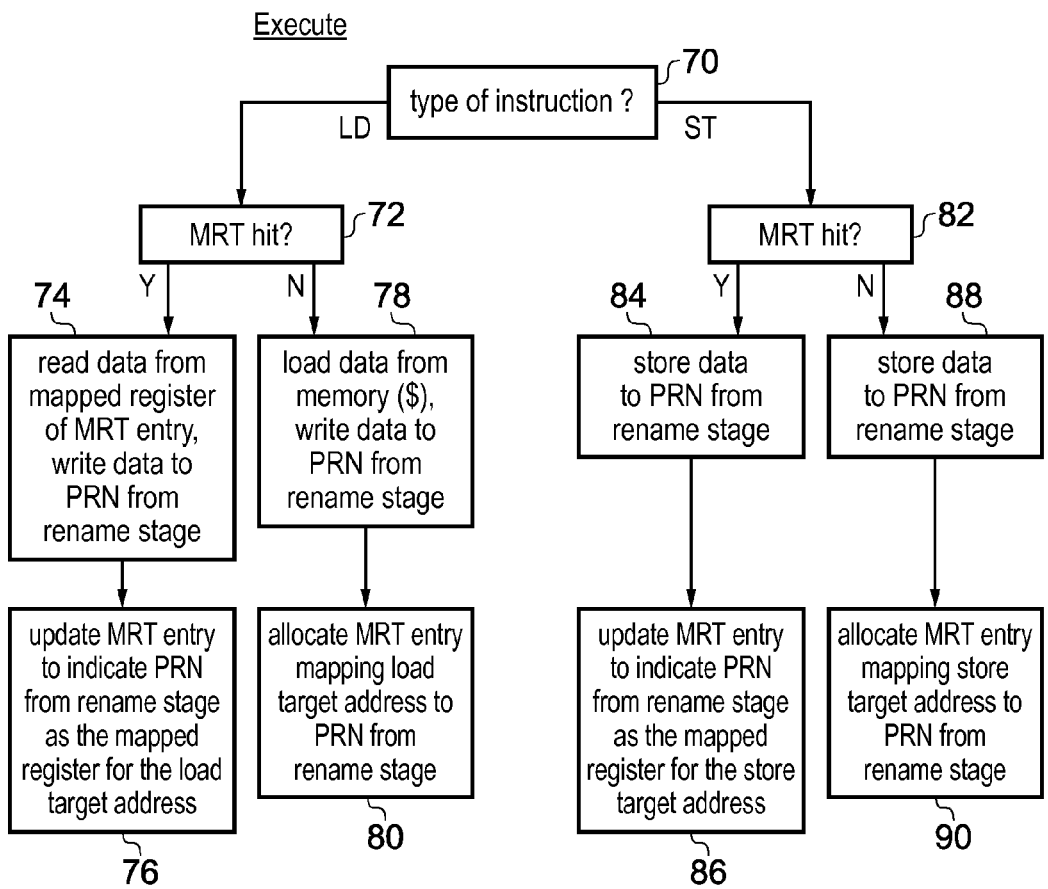
FIG. 9 illustrates an example method of executing load/store instructions.

The processing of load/store instructions is shown in the flow diagram of FIG. 9. At step 70 of FIG. 9, the execute stage 26 determines whether the current instruction is a load instruction or a store instruction. For a load instruction, it is determined at step 72 whether there is a hit in the MRT 54 (that is, there is a memory rename entry in the MRT corresponding to the load target address). If there is a MRT hit, then at step 74 the data required by the load is read from the mapped register indicated in the corresponding MRT entry, and then that data is written to the physical register which was allocated to the load instruction at the rename stage 20. At step 76, the corresponding MRT entry is updated to replace the previously indicated physical register number with the physical register number that was allocated to the load instruction at the rename stage 20. Therefore, the corresponding MRT entry will now identify a mapping between the load target address and the physical register number of the load destination register of the load instruction.

On the other hand, if there is a miss in the MRT, then following step 72 the method proceeds to step 78 where the memory read port 62 is used to load the required data from a location in memory 8, 10 identified by the load target address. The load instruction may stall for some time while the data is being fetched from memory. When the data is received from memory, it is written to the register file 6 in the register identified by the physical register number determined by the rename stage 20 at step 52. At step 80, a new MRT entry is then allocated to the load instruction, containing a mapping between the load target address and the physical register number allocated in the rename stage 20.

On the other hand, for a store instruction the method proceeds from step 70 to step 82 where it is again determined whether there is a hit in the MRT for the store target address. If there is a MRT hit then at step 84 the data is written to the physical register allocated for the store instruction by the rename stage 20 at step 54 of FIG. 8. At step 86, the corresponding memory rename entry for the store target address is updated so that it now indicates the physical register identified at the rename stage as the mapped register for the store target address. On the other hand, if there was a miss in the MRT, then following step 82 the method proceeds to step 88 where again the data associated with the store instruction is stored to the physical register allocated during the rename stage 20. However, at step 90 a new MRT entry is allocated for the store instruction, containing a mapping between the store target address and the physical register number of the register allocated in the rename stage 20.

Hence, regardless of whether there was a hit or a miss, following a load or store instruction there will always be an update to the MRT, either updating the physical register number for an existing MRT entry, or allocating a new MRT entry with a mapping between the load/store target address and the physical register number of the register allocated at the rename stage. This means that if there is a subsequent load instruction targeting the same address then it can obtain its data from the register file rather than loading the data from memory, improving performance and energy efficiency.

The execute stage 26 performs speculative execution of instructions and so the operations shown in FIG. 9 are performed for the speculatively executed instructions to update the MRT 34 at the execute stage. Once it is known that the speculative execution is correct, then the results of the instructions are committed (written to register file by writeback stage 28), and at this point the RMRT 36 is updated in the same ways as the MRT was updated in the execute stage 26. The RMRT 36 represents the last known state to be correct. If a misspeculation occurred then the state can be rewound by copying the contents of the RMRT 36 to the MRT 34.

In steps 80 and 90 of FIG. 9, the execute stage 26 selects an invalid MRT entry, which does not currently map an address to a register, for storing the address-register mapping for the load/store instruction. There are a number of different policies which can be used to control when the MRT entries become invalid and the corresponding registers are released for mapping to a different address or an architectural register specifier. Three examples of such register management policies using the state data 50 discussed earlier are explained below. The policies are described by the finite state machines (FSMs) shown in FIGS. 10-12 respectively, each representing different optimization levels. For each policy, we first provide an overview and point out any changes compared to the previous one. Then we explain the transitions and unique behaviors in each pipeline stage. These policies differ in how aggressively they attempt to keep memory values resident in the physical register file 6. For ease of reference, the policies are referred to using the labels "Simple", "Post-Retirement Storage" and "Store Coalescing" in order of least to most aggressive.

Simple Register Management Policy

Figure 10:
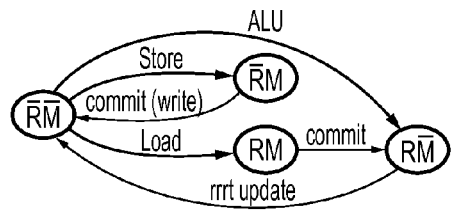
FIGS. 10 to 12 illustrate three examples of management policies for controlling the invalidation of memory rename entries and controlling the state of the corresponding registers.

FIG. 10 illustrates the "Simple" register management policy. Under the Simple policy, each physical register has 2 bits associated with it: the register bound flag R and memory-bound flag M discussed above. The register bound flag R is set if the physical register is associated with an architectural register and it is present in the corresponding entry in the Register Rename Table (RRT). Similarly, the memory bound flag M is set if the physical register is associated with a memory location and its entry is present in the MRT. This Simple FSM has 4 states, as shown in FIG. 10. The optimizations provided by this FSM are pre-retirement load-load forwarding and store-load forwarding. This policy puts no additional requirements on the number of registers needed since the MRT will only reference registers of in-flight instructions.

At the register rename stage 20, free registers (state $\overline{RM}$) are allocated and transitioned to the register and memory bound state (RM), for load operations. This is to represent that both the RRT and MRT references to this register need to be released before this register can be considered free. Instructions that do not use memory but do have destination registers, such as ALU operations, should transition their destination register to the only register bound state (RM). Store destination registers are allocated by the rename stage 20 but are placed in the only memory bound state, ( )since they have no architectural destination register, but will still be referenced in the MRT by its corresponding memory address.

At the execute (memory rename) stage 26, the address of a load/store instruction is looked up in the MRT. If the look-up is a hit, then the physical register number (PRN) for that entry is updated to indicate the register allocated for the instruction at the register rename stage 20. Otherwise the system will attempt to allocate a new entry from the invalid entries within the appropriate set. The restriction to only allocating invalid MRT entries is to ensure that all speculative values are represented in the table, rather than evicting and later loading a potentially stale value from the memory system. If no entry can be allocated within the associated set for this address, then the pipeline must stall.

At retirement of an instruction (writeback stage 28), any MRT entry allocated by the retiring instruction is made invalid under the Simple management policy. If the retiring instruction is a store, then the value of the destination register is written to the memory system (memory 10 or cache 8) and the register's state transitions to free ($\overline{RM}$). However, if the retiring instruction is a load, the RRRT still references the physical destination register, because it is the most recent committed value of the architectural destination. Therefore, the state of the load's destination register will transition to R$\overline{M}$ indicating that the destination register is still register bound, but is no longer memory bound. Any operation which overwrites a value in the RRRT will transition the overwritten register to the free state ($\overline{RM}$).

Hence, under this policy, the MRT entries are invalidated when the corresponding load or store instruction is committed. This means that the loaded data value or stored data value will remain resident in the register file 6 during the speculation window when the load/store instruction is in flight and has not yet been committed. This allows store-load forwarding or load-load forwarding for instructions where the reuse distance (number of instructions between successive loads/stores to the same address) is relatively low.

Post-Retirement Storage Register Management Policy

Figure 11:
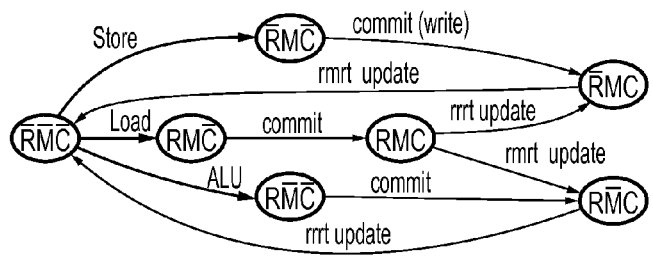

The Post-Retirement Storage policy is represented by the FSM illustrated in FIG. 11. This policy allows the pipeline to keep post retirement values resident in the register file, avoiding a memory access if the values are needed again. To do this, the committed flag C discussed earlier is added. The committed flag C signifies whether a MRT entry pointing to that register can be allocated. A MRT entry pointing to a non-committed entry cannot be evicted because otherwise this would require the corresponding data value to be saved to memory and then loaded again later. This policy increases the effective number of physical registers needed to prevent deadlock or stall by the number of entries in the MRT. This is because even after instructions commit, their destination may still be referenced by the MRT, preventing another instruction from allocating that register.

In the rename stage 20, free registers having state $\overline{RMC}$ are allocated for instructions. It is not possible to allocate registers whose state has not been committed, or which are already bound to a memory address or architectural register specifier. After allocation, the register becomes purely register bound ($R\overline{MC}$) for destination registers of non-memory (e.g. arithmetic) instructions, both register and memory bound ($RM\overline{C}$) for destination registers of load instructions, and purely memory bound (RMC) for destination registers of store instructions.

Common to all the policies, at the execute stage 26 a load/store target address will be looked up in the MRT 34. If the look-up is a hit, then the PRN for that entry will be updated to the PRN of the physical register allocated for this instruction in the register rename stage 20. Otherwise a new entry in the MRT must be allocated. Preference is given to allocating an entry which is currently invalid. If no invalid entry exists, a victim MRT entry is selected among the entries for which the corresponding mapped register has the committed flag C set to indicate that the result of the corresponding instruction has been committed. The victim may be selected using a selection policy, such as LRU or pseudo LRU for example. The data stored in the register identified by the victim MRT entry is evicted, and the MRT entry is updated with the mapping between the load/store target address and the physical register number of the register allocated for the instruction at the rename stage 20. If none of the registers in the committed state C, then the pipeline stalls.

Unlike in the Simple policy, with the Post-Retirement Storage policy, MRT entries are not invalidated at retirement of the corresponding instruction. If the retiring instruction is a store, the value of its associated register is written back to memory and the state of the register is transitioned from $\overline{C}$ to C. A load will make this transition with no write to memory. If an RRRT update occurs, meaning the committed value of an architectural register changes, such as with load and ALU instructions, then the register that was previously referenced by the RRRT is transitioned from the R state to the $\overline{R}$ state. When an RMRT entry is updated or evicted, the old register referenced by the RMRT transitions from M to $\overline{M}$.

Figure 12:
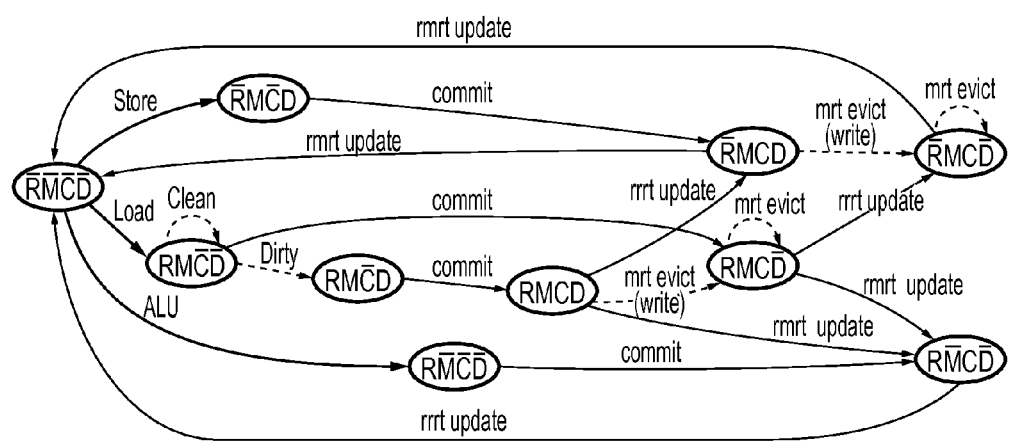

Hence, this policy allows data to remain resident in the register file 6 for longer than the Simple policy, increasing the likelihood that data can be reused for store-load or load-load forwarding without requiring a memory access.
Store Coalescing Policy FIG. 12 shows the FSM for the Store Coalescing policy. With this level of optimization when two stores to the same address are made, and the first store was not yet evicted from the MRT by the time the second store executes, only the second store will cause a write. Hence, the stores are coalesced. To do this, the policy introduces the dirty flag (writeback flag) D shown in FIG. 5 to the register state. With this bit, the machine is capable transferring responsibility for the memory write to later instructions which also access this memory location. Using this transfer of responsibility for dirty data, this policy is capable of not only marking stores as not-dirty when they would be overwritten, but also makes use of loads that assume the dirtiness as a means of keeping the dirtiness resident in the register file longer, in hopes of a later store coalescing the dirtiness. As with Post-Retirement Storage, this policy also increases the number of physical registers needed by the number of entries in the MRT.

Similar to the previous policies, the register rename stage 20 will allocate free registers, those with state $\overline{RMCD}$. The allocated register will then become purely register bound (R $\overline{MCD}$) for destination registers for non-memory instructions, register and memory bound ($RM\overline{CD}$) for load destination registers, and memory bound and dirty ( ) for store destination registers.

At the execute stage 26, the load/store target address is looked up in the MRT. If it is a hit, then the PRN for that entry will be updated to the destination register allocated by the executing instruction in the register rename stage 20. In the case of a load, the dirty flag D must be made to match the register that is currently referenced by the corresponding MRT entry for the load target address. This is in effect tentatively transferring spill responsibility to the load. For a store instruction, the register currently referenced by the MRT entry has its dirty flag D updated to $\overline{D}$ to indicate that the value is no longer considered dirty, and the store destination register will already have been set to dirty (D) at the rename stage, so that responsibility for writing back the value to memory is now passed to the new store instruction (rather than an earlier store instruction or load instruction associated with the register currently referenced by the MRT entry). This avoids unnecessary writebacks as the writeback can be deferred until the MRT entry associated with the last instruction for a given address is evicted. If the look-up was not a miss, then an eviction must be attempted. Like in the Post-Retirement Storage example, invalid entries are given eviction preference. Afterwards, LRU or pseudo LRU eviction is performed on committed entries. If an eviction of a dirty entry is performed, a memory system write must be performed and the D bit transitioned to $\overline{D}$ for that register.

As in the Post-Retirement Storage policy, any destination register will be transitioned to the committed state, turning the C bit on (C instead of $\overline{C}$), during its instruction's retirement. If an architectural register has a new value committed to the RRRT, the register containing the old value will transition the state from R to $\overline{R}$. Similarly, any register that is no longer referenced by the RMRT will be transferred from M to $\overline{M}$. Unlike in the Post-Retirement Storage policy, no write to memory has to occur for dirty registers in this stage. All writes happen on eviction in execute. For a dirty reference to reach this stage, responsibility for the write must have already been transferred to the overwriting instruction.

Hence, this policy enables the number of writeback operations to be reduced, reducing memory traffic and hence improving performance when a load from memory is required.

Figure 13:
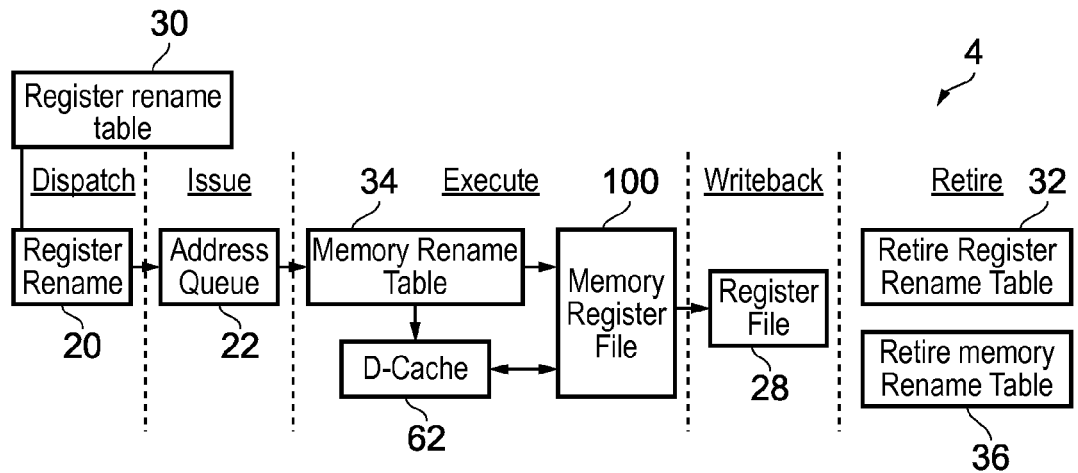
FIG. 13 illustrates a second example of a portion of the pipeline of the processing circuitry.

FIG. 13 shows a second example of a portion of the processing pipeline of the processing circuitry 4. As in FIG. 3, there are dispatch, issue, execute and writeback stages, but in FIG. 13 a retirement stage is also shown. Although the register file stage and register file read port 24 is omitted from FIG. 13, it could also be provided as shown in FIG. 3. The elements of FIGS. 3 and 13 shown with the same reference numbers are the same. FIG. 13 differs from FIG. 3 in that the registers which can be mapped to memory addresses using the memory rename table 34 are part of a memory register file 100 which is separate from the general purpose register file 28 which is used by the processing circuitry 4 in response to program instructions specifying architectural register specifiers, which are mapped to physical register specifiers by the register rename table 30. In other embodiments, the memory renaming registers 100 and the general purpose registers 28 could be different subsets of a single register file. In these embodiments, rather than allowing each register to be either mapped to an architectural register specifier by the register rename table 30 or mapped to a memory address by the memory rename table 34, some registers can only be mapped to memory addresses and other registers can only be mapped to architectural register specifiers. This simplifies register management since allocation of registers for memory renaming is independent of allocation of registers for register renaming, and so the control of the register rename table 30 and memory rename table 34 does not need to consider the allocations made by the other table. Otherwise, the example of FIG. 13 operates in the same way as the earlier example of FIG. 3.

Figure 14:
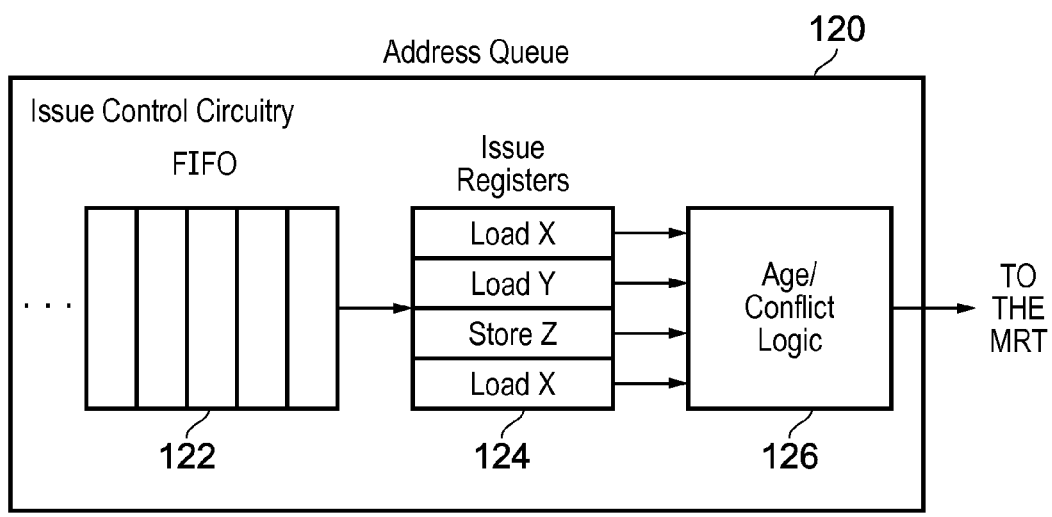
FIG. 14 illustrates an example of issue control circuitry for controlling issuing of load/store instructions for execution.

FIG. 14 shows an example of issue control circuitry 120 which can be used as part of the address queue 22 in FIG. 3 or FIG. 13. The issue control circuitry 120 has an instruction FIFO (first-in first-out) buffer 122 which receives instructions from the register rename stage 20 and buffers the instructions in their original program order. The issue control circuitry 120 also has issue registers 124 for storing data representing load or store instructions to be issued, and age/conflict logic 126 for selecting an instruction from the issue registers 124 and issuing the selected instruction to a subsequent pipeline stage of the processing circuitry for processing. The age/conflict logic 126 is generally free to select any of the load/store instructions stored in the issue registers 124 whose addresses and/or operands are ready. However, to ensure correct processing and avoid deadlocks there are a number of constraints.

Firstly, a load/store instruction may be prevented from issuing ahead of an earlier store instruction in the program order which specifies the same target address. This ensures that updates to the data value associated with the same address are handled in the correct order, so that later instructions will access the correct value.

Also, a store instruction can be issued ahead of no more than N earlier store instructions, where N is the associativity of the memory rename table 34. This is achieved by providing N issue registers 124 and ensuring that entries relating to later store instructions cannot be removed from the issue registers 124 until all earlier store instructions have been issued, even if the later store instruction has already issued. This ensures that intervening stores are tracked even once issued, to prevent a later store bypassing a store that is N or more stores earlier in the program order. In some cases, this constraint may apply only to store instructions which map to the same set of the memory rename table 34 (i.e. have the same index portion of the address), although it may be simpler in other examples to apply this constraint to store instructions in general so that no store instruction can pass more than N other stores in the program order. This constraint avoids potential deadlocks which could occur if all the memory rename table entries in a set are taken, which would mean that an earlier store instruction targeting the same set cannot be issued, and given the constraint mentioned in the previous paragraph, that subsequent load/store instructions to the same address could also not be issued. If all the issue registers 124 are full, then no other instructions could be issued, causing a deadlock. Hence, by restricting the issuing of the $N^{th}$ store instruction (or the $N^{th}$ store instruction having the same index portion of the address) after a still-to-be-issued store instruction, performance can be improved by avoiding these deadlocks and allowing other instructions to be issued.

The memory rename table 34 may also have some constraints on evictions of memory rename table entries corresponding to speculatively executed instructions which have not been committed yet. If a memory rename entry corresponding to a speculatively executed instruction was evicted to make room for a memory rename entry corresponding to a different address, then the mapping between the mapped register and the address would be lost, and so subsequent load instructions may encounter a memory rename table miss and so fetch an out of date value from memory rather than a potentially more up to date dirty value in the mapped register, leading to incorrect processing results. This can be addressed by preventing evictions of memory rename table entries corresponding to speculatively executed instructions until those instructions are committed. On the other hand, a memory rename entry corresponding to a speculatively executed instruction may be overwritten with a new register mapping for a later instruction specifying the same target address, because this still preserves the mapping between the memory address and an up to date value in the register, and so processing can still proceed correctly.

Figure 15:
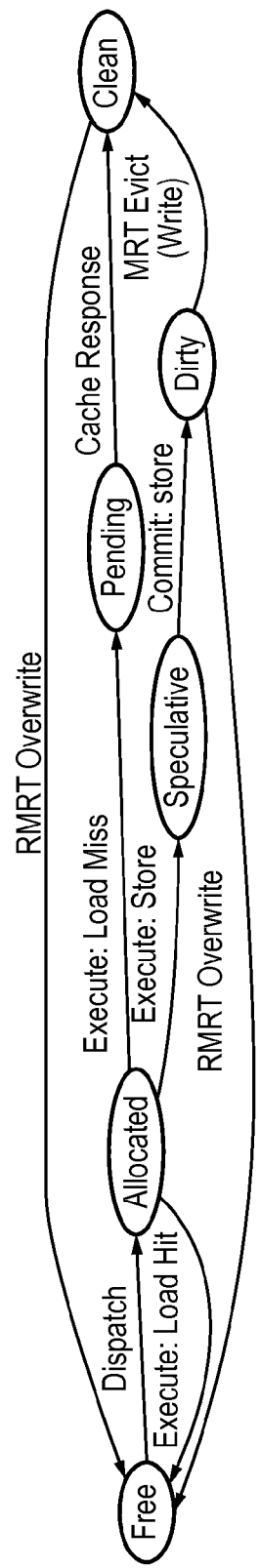
FIG. 15 illustrates a fourth example of a management policy for controlling register state.

FIG. 15 shows a fourth example of a register management policy which can be used for tracking the allocation of the registers of the memory register file 100 for memory renaming in examples such as FIG. 13 where separate groups of registers are provided for register renaming and memory renaming respectively. The policy of FIG. 15 is similar to the policy of FIG. 12, but is simpler because it only tracks memory renaming, and so does not need to track the "R" bit which indicates whether registers have been allocated for register renaming. FIG. 15 is a state diagram showing named states "Free", "Allocated", "Speculative", "Pending", "Dirty" and "Clean", which can be represented by control bits associated with each register in a similar way to the control information 50 shown in FIG. 5.

With the management policy of FIG. 15, when a load instruction is executed and there is a memory rename table hit for the load target address, then the memory rename entry for that address is not updated with the register mapping allocated to that load instruction (step 76 of FIG. 9 is not performed). This is different to the policies shown in FIGS. 10-12. Instead, the memory mapped register allocated to the load instruction is made available for allocation to other instructions (see the "Allocated" to "Free" transition in FIG. 15). There is no need to allocate a memory mapped register for the load instruction because if there is a hit in the memory rename table (MRT) 34 then the value from memory is already present in the memory register file 100, and this value can simply be written to the destination register 28 of the load instruction.

The transitions of registers of the memory register file 100 when using the management policy of FIG. 15 are as follows:

Registers are initially in the "Free" state.

When a load/store instruction is dispatched by the register rename stage 20, a register is allocated for mapping to the target address of the load/store instruction, and that register transitions to the "Allocated" state.

If a load instruction at the execute stage encounters a hit in the memory rename table 34, then the register allocated to that load instruction at the rename stage transitions to "Free" and no MRT entry is allocated for that instruction.

If the load instruction at the execute stage encounters a miss in the MRT 34, then a MRT entry is allocated to map the target address of the load instruction to the register allocated to the load instruction at the rename stage, and that register transitions to the "Pending" state while the load instruction waits for the required data to be fetched from cache/memory.

When the data fetched from cache/memory is received for the load instruction, then the mapped register for the target address of the load instruction transitions to the "Clean" state.

When a store instruction is speculatively executed, the register mapped to the store target address at the rename stage transitions from "Allocated" to "Speculative".

When the store instruction is committed, the register mapped to the store target address transitions from "Speculative" to "Dirty" (indicating that the value in the mapped register is not the same as the corresponding value in cache/memory).

If the memory rename entry associated with a register in the "Dirty" state is evicted from the memory rename table 34, a write back to memory is performed and the register transitions from "Dirty" to "Clean".

If an entry in the retirement memory rename table (RMRT) 36 is evicted or overwritten (which could correspond to a Clean register mapped to the target address of a load instruction, or a Clean or Dirty register mapped to the target address of a store instruction), then the register transitions back to the "Free" state.

This approach ensures that mappings between registers and memory addresses are retained at least until store instructions are committed, and beyond that if the memory rename entry corresponding to that store instruction is not evicted for some time after committing the store instruction, to increase the likelihood that store-to-load forwarding is possible without needing to fetch the load target value from memory.

FIG. 16 is a table showing an example of instructions passing through the stages shown in FIG. 13 and the transitions of the registers of the memory register file 100 according to the policy shown in FIG. 15, memory rename entries of the memory rename table 34 and entries of the retirement memory rename table 36. For simplicity, it is assumed that the memory rename table 34 and retirement rename table 36 only have one entry, and that there are only three memory renaming registers R0-R2, but it will be appreciated that more would in practice be provided. The letters X, Y refer to different target addresses of load/store instructions. The letters A, B, C are labels to distinguish different load/store instructions targeting the same address. The example proceeds as follows:

0. All the registers R0-R2 are in the "Free" state
1. A first load instruction A targeting address X is received. The rename (dispatch) stage 20 allocates register R0 for mapping to address X, and so register R0 transitions to the "Allocated" (Alloc) state.
2. The first load instruction A is dispatched to the issue stage.
3. A second load instruction B targeting address X is received. The rename stage 20 allocates register R1 for mapping to address X, so register R1 transitions to the "Allocated" state.
4. The second load instruction B is dispatched to the issue stage.
5. The second load instruction B is issued to the execute stage, and there is MRT miss for address X, so MRT 34 allocates a memory rename entry for mapping the address X to the register R1 allocated at the rename stage, the register R1 transitions to "Pending", and the second load instruction B waits for a cache/memory response for address X.
6. A first store instruction A targeting address Y is received and the rename stage 20 allocates register R2, which transitions to "Allocated".
7. The cache/memory response for the second load instruction B is received, so instruction B moves to the writeback stage to write the fetched data to a general purpose destination register in register file 28, and the register R1 transitions to "Clean".
8. The second load instruction B is committed and moves to the retire stage, and the memory rename entry associated with this instruction is placed in the retirement memory rename table (RMRT) 36.
9. The first load instruction A is issued and passes to the execute stage. There is a MRT hit for address X, indicating that the value at address X is already present in register R1. Register R0 that was allocated to the first load instruction transitions to "Free" so that it can be reallocated to other instructions.
10. The first load instruction A proceeds to the writeback stage where the value from memory mapped register R1 is written to the one of the general purpose registers 28 that is the destination register for the first load instruction A.
11. The first load instruction A is committed at the retire stage. As the first load instruction does not have an associated MRT entry, the RMRT stays the same.
12. The first store instruction A is dispatched to the issue stage.
13. The first store instruction A is issued to the execute stage. A MRT entry is allocated to map the register R2 allocated to the store instruction A at the rename stage to the store target address Y. Since the register R1 indicated in the previous MRT entry is Clean it is possible to evict the previous MRT entry without needing a writeback to memory for address X. The store instruction is speculatively executed to update the register R2 mapped to the store target address Y with the value to be stored to memory, and so register R2 transitions to "Speculative".
14. A second store instruction B for address Y is received, and since register R0 is "Free", this register can be allocated to the store instruction. Register R0 now transitions to "Allocated".
15. The second store instruction B is dispatched to the issue stage.
16. The second store instruction B is issued to the execute stage and speculatively executed. Since there is a MRT hit for the store target address Y, the MRT entry for address Y is overwritten with the new register mapping R0 instead of R2 (similar to step 86 of FIG. 9). Register R0 transitions to "Speculative". A writeback to memory is still not necessary, since the value in R0 is now the most up to date value for address Y.
17. The first store instruction A is committed (retired). The store instruction does not require the writeback stage since there is no write to a general purpose register 28 for a store instruction. The register R2 mapped to the store instruction A transitions to "Dirty" since it now contains a committed data value which is different to the corresponding value in cache/memory. The RMRT is updated with the mapping of register R2 to the store address Y, so that if processing has to be rewound to this point of execution then the MRT 34 can be restored to the state which it had just after the first store instruction A was speculatively executed. The previous RMRT entry for register R0 was evicted to make room for the new RMRT entry, so register R0 transitions from "Clean" to "Free".
18. The second store instruction B is committed. Again, no writeback to general purpose registers 28 is required. Register R0 transitions to "Dirty", and the RMRT 36 is updated with an entry mapping register R0 to address Y. The previous RMRT entry for register R2 is evicted, and so register R2 transitions from "Dirty" to "Free". There is no need for a writeback of address Y because the latest value for address Y is still in register R0.

19. A third load instruction C is encountered targeting address X. Register R1 is free, and so it is allocated for the load instruction and transitions to "Allocated".

20. The third load instruction C is dispatched to the issue stage.

21. The third load instruction C is issued to the execute stage. There is a miss in the MRT 34 for address X, so a MRT entry needs to be allocated. As there is no room in the MRT 34, the entry mapping register R0 to address Y needs to be evicted. As the register R0 associated with this entry is "Dirty", a writeback of the data value in register R0 to memory is performed. Register R0 now transitions to "Clean". A new MRT entry is allocated mapping the load target address X to the register R1 allocated to the load instruction in the rename stage, and register R1 transitions to "Pending".

22. The third load instruction C receives a response from the cache/memory and proceeds to the writeback stage where the loaded value is written to a destination register in the register file 28. Register R1 transitions to "Clean".

23. The third load instruction C is committed, the RMRT 36 is updated with the MRT entry for the third load instruction C, and register R1 transitions to "Clean".

Hence, the policy of FIG. 15 enables the correct processing results to be obtained for speculatively executed load/store instructions, while enabling load-to-load forwarding (e.g. between load instructions A and B) and store-to-load forwarding (e.g. between store instruction B and load instruction C), and reducing the number of writebacks to memory for store instructions. This reduces the amount of memory traffic and improves performance.

Figure 17:
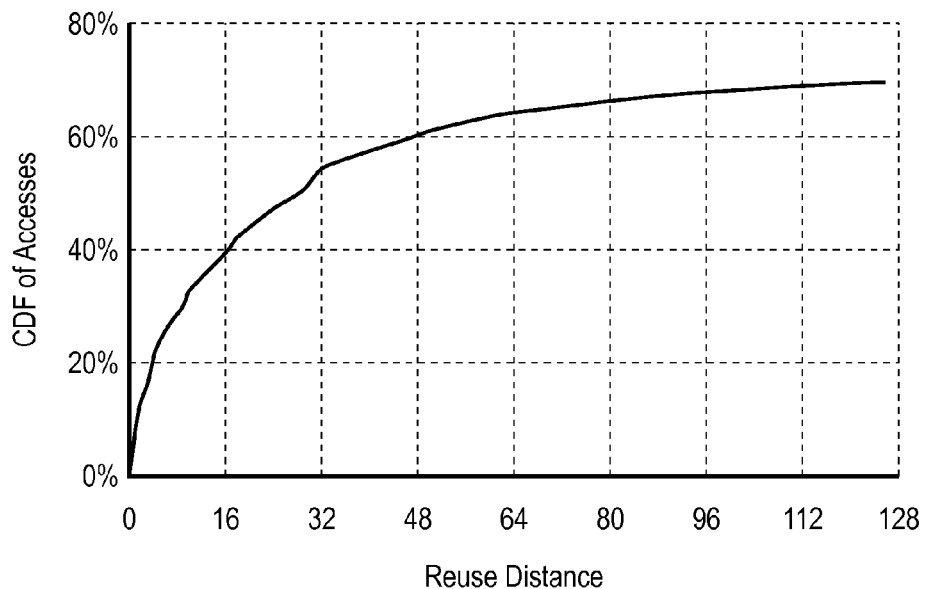
FIG. 17 is a graph depicting simulation results tracking the reuse distance between load/store accesses to the same address.

Analysis of the performance improvement and energy savings achievable using the present technique is discussed below. FIG. 17 is a graph illustrating the locality of memory accesses. The graph shows the percentage of memory accesses which reuse the same address as an instruction a given number of accesses earlier. The reuse distance represents the distance between accesses to the same address, and is measured in terms of a number of accesses to distinct addresses. This was measured in simulation using the SPECINT benchmark when compiled for the ARM instruction set architecture provided by ARM Limited, of Cambridge, UK. FIG. 13 shows that if 64 of the most recently accessed values from memory can be preserved in the register file then more than 60% of memory accesses can be handled using the register file rather than needing to access memory, representing a significant performance improvement. The following paragraphs identify some of the reasons why memory values are reused so frequently.

Firstly, register pressure manifests itself as a load/store pair with short term reuse, and it is what makes register allocation such a fruitful area of compiler research. When more live values exist than free registers, the compiler or assembly programmer must demote these values to memory. This problem is exacerbated with aggressive compiler optimizations as they can often increase the number of live values. To reduce the incidence of these spills, the ISA can provide additional general purpose registers, but this comes at the expense of instruction density, pipeline structure size, and potentially the loss of backwards compatibility. Additionally, this may actually increase the incidence of spills caused by function calls.

Also, demotion across a function call may trigger short term reuse of memory values.

The ABI (application binary interface) often mandates what registers must be saved to memory by the calling function or the called function. Either way, for a register to be used by the called function, the previously resident values must be temporarily stored in memory. The duration of this storage may be very short depending on the length of the function body. Function inlining and link time optimizations are well known techniques to mitigate this overhead, but, as FIG. 17 shows, they cannot completely remove this problem.

Also, pointer aliasing may cause short term reuse of memory values. The inability of a compiler to disambiguate most pointers means that it must assume that many store operations may potentially affect any memory address. The following C-like pseudo code illustrates this point:

```
while ( condition ) {
    r1 = *ptr1;
    *ptr2 = r2;
    . . .
}
```

In this example, the compiler often cannot guarantee ptr1 differs from ptr2. This means the load to r1 cannot be hoisted out of the loop, where it would be performed once and the result could be used for all iterations. Instead, a potentially unnecessary access to the memory will be performed every iteration, often to the same address.

In each of these cases, using the memory renaming technique discussed above to map memory accesses to the registers enables the values to be retained in the register file so that they do not need to be fetched from memory soon after being stored to memory.

Trace-based simulation was used to evaluate the advantages of the present technique (referred to as "Tetra" below and in the Figures). This in-house simulator implements for comparison a MIPS R10000-like pipeline with a standard load-store unit featuring a store buffer as baseline, and the present technique using the three different register management policies discussed above. The simulator was fed with an Oracle dynamic instruction stream. This model features no instruction fetch side hazards such as branch prediction or icache misses. This was considered fair since all modeled pipelines employ near identical branch resolution mechanisms and penalty. If anything, the results should only bias in favor of the baseline since the MRT will be warm on recovery and the store buffer will not. This oracle trace was generated using the gem5 simulator (Binkert et al, SIGARCH Computer Architecture News, 39(2):1-7, August 2011) with the ARM instruction set.

The benchmarks used consisted of all of SPECINT 2006 (John L. Henning, SPEC CPU2006 Benchmark Descriptions, SIGARCH Computer Architecture News, 34(4):1-17, 2006). Each trace includes 2 billion instructions, but no statistics are collected for the first 1 billion to allow for cache warm up. The traces were fed into each architecture model for detailed comparisons. To monitor detailed performance and energy cost, the simulator keeps track of a variety of statistics including register file, cache, and memory read/write as well as cycle count.

Each architecture was configured with a variety of resource constraints. Three different pipeline configurations were used: high, medium and low. The high-end configuration was modeled as an approximation of the cutting edge Intel Haswell core, while the medium and low-end configurations were modeled to be similar to the ARM Cortex A15 and Cortex A9 respectively. These three resource constraints were chosen to represent the applicability of Tetra to the entire spectrum of out-of-order cores on the market today. Detailed parameters of all three configurations are listed in the table of FIG. 18.

McPAT (Li et al, "McPAT: An integrated power, area, and timing modeling framework for multicore and manycore architectures", Microarchitecture, 2009. MICR0-42, $42^{nd}$ Annual IEEE/ACM International Symposium on, pages 469-480, 2009) was used to estimate power and energy for the designs under evaluation. For these studies a 22 nm technology node was targeted, modeling multi-gate devices and aggressive interconnect projections on wire technologies. The nominal clock frequencies for the high, medium, and low-end configurations are 2.5, 1.7, and 1 GHz, respectively. These values match the clock frequencies of current industrial designs, and the peak power figures obtained with the model were validated against publicly available data of comparable commercial microprocessors.

Evaluation

Multiple parameter sweeps were performed across the full benchmark suite. The first is of the three configurations detailed in FIG. 18. This sweep gave an overview of both overall processor performance measured in IPC (instructions per cycle), and relative cache bandwidth measured in read and write memory system accesses. Additionally, the MRT associativity and size were swept independently with the various resource constraints. All values are presented relative to the performance of the baseline load/store unit with store buffer.

IPC

The performance results for the three resource constraints (low, medium high) and three register management policies discussed above (Simple, Post-Storage Retirement and Store Coalescing) are shown in FIG. 19. Results are presented as a percentage improvement over the IPC of the baseline store buffer. As we expect, the performance of the Simple policy with Tetra is comparable in performance to that of the store buffer. There is some small speedup, an average of 1.5%, due the support for forwarding loaded values if two loads to the same address happen within the speculative window before the first load has been committed.

Post-Retirement Storage Tetra receives an average 13% increase in IPC over the baseline store buffer. This is expected as Post-Retirement Storage prevents memory accesses which take more cycles than register file accesses. Additionally, there is more effective cache bandwidth as accesses which would previously occupy a cache port are now serviced by the LSU.

Store Coalescing Tetra causes an average speedup of approximately 20% over the baseline store buffer. This additional gain is a result of the more aggressive prevention of cache accesses over the previous policy. The primary difference being that Store Coalescing policy does not need to issue a write for every committing store, only addresses which have not been touched long enough to be evicted. The fact that this lazy writeback produces such a significant performance benefit suggests these writes are a sizable cause of slowdown. As shown later, in the Post-Retirement Storage policy, writes account for the majority of memory accesses and are significantly reduced by the more aggressive policy.

Cache Bandwidth

As the throughput of instructions increases, so does the rate with which memory operations are issued. These operations are not only higher latency than necessary, but they also needlessly contend on the cache ports. Filtering many of these accesses will alleviate these problems. With each register management policy, Tetra sees a dramatic reduction in the number of memory operations which reach the cache. This reduction is shown in FIG. 20. While the rate of these operations change between the differing resource constraints, the raw number of accesses is identical.

Though the data in FIG. 20 does not necessary display the reduction in contention, when coupled with FIG. 19 some attributes of the contention can be inferred. For example, despite the rate of memory operations increasing in the high resource configuration, the speedup observed is reduced since the contention is mitigated by the additional cache port, absent in the other configurations.

Simple Tetra makes minor reductions in memory accesses from the baseline with its load-to-load forwarding. This reduction is minor, 3%, and is entirely a reduction in reads as evidenced by the figure. Post-Retirement Storage Tetra makes a major impact on the number of reads, measuring up to 37% of all accesses. Once again though, there is no reduction in writes since each store must still be propagated to the cache. This reduction in loads is a result of the register management policy aggressively preserving a memory value in the register file for each entry in the MRT. In Post-Retirement Storage Tetra, writes become the dominant memory operations due to the large reduction in reads from the previous optimizations. The ratio of stores to loads was restored by Store Coalescing Tetra, allowing stores to be lazily propagated and thus opening a larger window to prevent writes which would only be overwritten anyway. With this level of aggression, the average number of memory accesses is reduced to 42% of the baseline. This is approximately the expected coverage from the motivational study in FIG. 17 for a re-use distance of 64, the size of the MRT.

Sensitivity

In order to properly understand the resource requirements of Tetra the parameters of the new structure, the MRT, were swept. The parameters of this structure are the associativity and size. For all experiments pictured, the MRT has 64 elements and is fully associative, except when the parameter is being swept. For the Post-Retirement Storage and Store Coalescing register management policies, the physical register file size must be increased by a number equal to the number of entries present in the MRT. This is because these policies will aggressively keep values in the register file and must be large enough to support this preservation.

MRT Associativity

Most of experiments make the assumption of a fully associative MRT, however this is not necessary for the correctness in Tetra. To determine where a tradeoff may occur, the MRT associativity was swept, resulting in FIG. 21. As expected, with associativities ranging from from direct mapped to fully associative, performance increases with associativity. However, the returns do diminish quickly, and it may be good exchange to make the structure of lower associativity to increase scalability. The structure can be scaled both in number of ports and in capacity.

MRT Size

To ensure we used the properly provisioned MRT and in order to better understand the effect of MRT size on the performance of the different versions of Tetra we swept this parameter. It is apparent from FIG. 22 that as the size of the MRT is increased all versions of Tetra increase in performance, with a roughly logarithmic diminishing return. This is in agreement with the estimated coverage from FIG. 17.

For Simple Tetra, this diminishing return is the most extreme. This is due to a lack of post-retirement storage in the design. Therefore, the performance is not altered as the MRT increases in size past the maximum number of in-flight memory operations. In order to verify this we swept MRT size with Simple Tetra for our Low, Medium, and High parameter configurations. Each subsequently larger configuration has a larger execution window and as is shown by our experiments, requires a larger MRT before performance saturates. We did find that the full window size was not required to extract nearly all of the potential performance.

Post-Retirement Storage Tetra and Store Coalescing Tetra do not have such low performance saturation. Their performance distribution by size is more similar in character to that of a cache because of their post retirement storage. Performance can be expected to saturate whenever the size is large enough such that the entire footprint of reused data can fit in the structure. However, this would of course be unimplementable for most workloads.

Benchmarks

Figure 23:
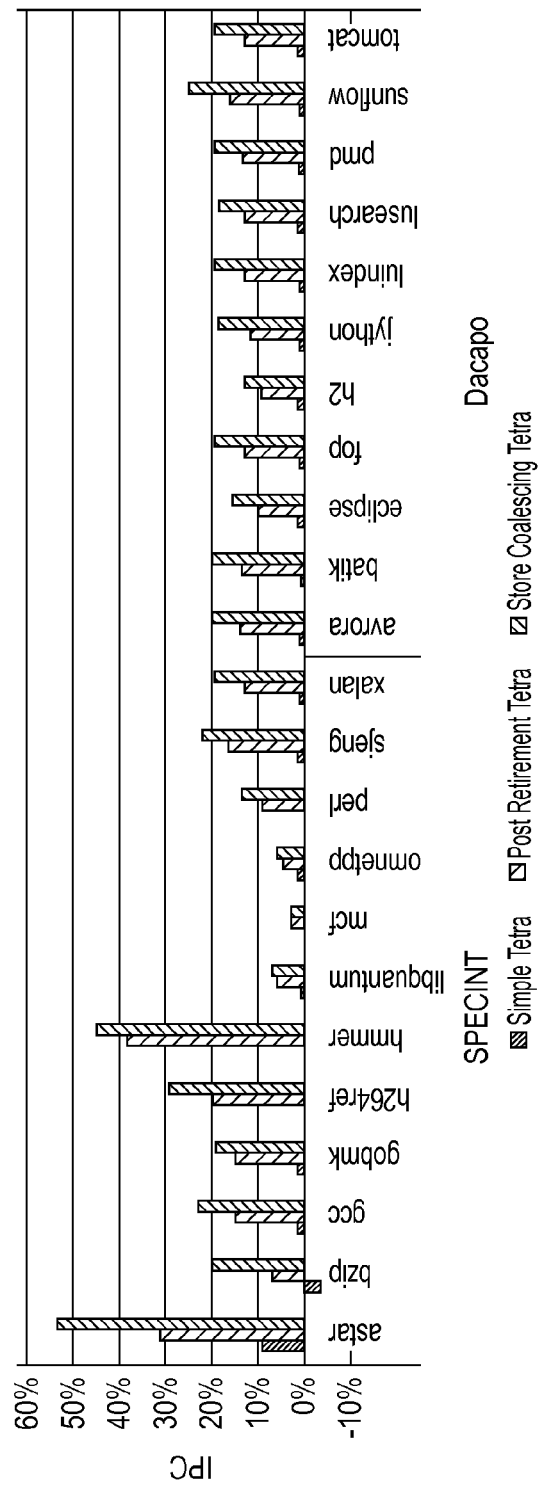

The per-benchmark performance is shown in FIG. 23 to display how much variance is seen between workloads. This variance in performance is a result of the diversity in the amount of locality in each program. For example, mcf touches a lot of distinct data, ruining the locality. astar however has many accesses which hit in the MRT. The speedup is also influenced by when the hits to the MRT occur. A greater speedup will be observed if they occur in a phase of high cache port contention.

To show that the same trends are observed in benchmarks besides SPECINT we ran the Dacapo benchmark suite (Blackburn et al, "The DaCapo benchmarks: Java benchmarking development and analysis", OOPSLA '06: Proceedings of the $21^{st}$ annual ACM SIGPLAN conference on Object-Orientated Programming, Systems, Languages and Applications, pages 169-190, October 2006) on gem5 with the oracle hotspot virtual machine. These workloads display the same trend, but to a slightly lower degree and with higher consistency.

Power and Energy

We first evaluated the impact of our architecture on the power consumption of the data cache. Our results report that Tetra reduces data cache dynamic power by 7.2%, 5.7%, and 6.0% for the low, medium, and high-end machines, respectively. Enhancements in our architecture can further reduce dynamic power consumption. Compared to our baseline microprocessor, our Post-Retirement Storage design can save 26.3% of the data cache dynamic power, while Store Coalescing can reduce it by 45.5%. Once leakage is considered, the three designs proposed contribute to reduce total data cache power consumption by 1.5%, 6.7%, and 11%, respectively.

Figure 24:
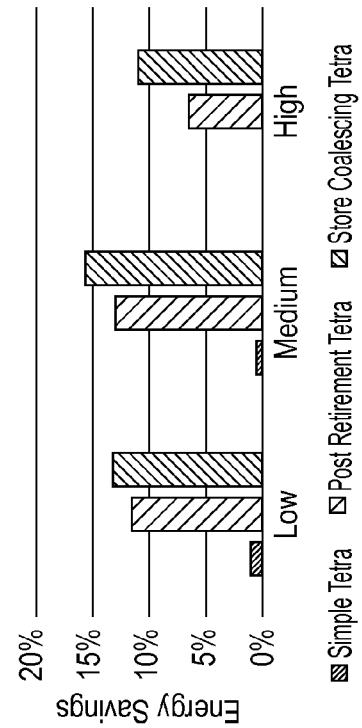

We then evaluated the total power and energy consumed by a core augmented with Tetra. Despite the reduction in data cache power consumption, our studies reported a slight increase in total core power consumption (between 4.3% and 0.5%, depending on the configuration). We justify these results with the higher throughput achieved by our designs and marginally larger register files. Indeed, while Tetra reduces the burden and the power consumed by the memory subsystem, it also increases the average number of instructions executed per cycle. As a result, our design improves core efficiency, yielding a significant reduction in the energy needed to execute a task. FIG. 24 summarizes our results, showing that a core deploying an optimized Tetra design achieve energy savings up to 15%, depending on the configuration considered.

Further observations regarding the present technique (Tetra) are provided below. Just as with any sophisticated LSU, Tetra has influence on the components necessary to support a shared memory multicore system. While Tetra may or may not be useful in providing additional optimizations to these components, it doesn't impose any additional restrictions beyond those imposed by an LSU of equivalent optimization.

LSU aggressiveness is tied to an architecture's memory consistency model. Similarly, in Tetra, the consistency model is dependent on the register management policy. Of the policies discussed above, all of them can support at least Relaxed Memory Ordering without modifications. Memory fences must invalidate every entry in the MRT. This will ensure than any data accessed beyond this point will be newly fetched from the cache. With small modifications to the policies, more restrictive models can be supported. For example, if the Simple policy, discussed earlier, did not allocate MRT entries for load instructions, then sequential consistency would be supported.

If shared data is stored in the Tetra pipeline, then invalidation requests generated by coherence protocols may need to be propagated up into the MRT to prevent the thread from reading stale data. Once again, this same behavior would be necessary for an LSU of equivalent optimization. In Tetra, processing these invalidations could be done with lower overhead due to the scalability of the MRT.

Tetra may have useful properties for transactional memory systems. If a guarantee could be made that a transaction touches fewer addresses than the associativity of the MRT, then the entire speculative state can be stored in the rename tables and recovered from the retirement tables if a transaction needs to be replayed. Even if this guarantee cannot be made, Tetra does not impose additional restrictions to transactional memory support beyond that of a LSU with an equivalent level of optimization.

In summary, the present technique provides a way of exploiting the fact that, as an artifact of the way software is written or generated today, the reuse distance of many values in memory is very short, short enough to be stored in the physical register file instead of the cache. The present technique provides a pipeline with the ability to transparently keep this data in the register file and propose three different management policies for those registers. The first of these polices is named Simple. The optimizations provided by this policy are store-to-load and load-to-load forwarding. Over the store buffer this results in an additional 1% speedup over the store buffer baseline. The Post-Retirement Storage policy will hold values after retirement until an eviction results from insufficient capacity. This policy sees a speedup of 13% on average. The Store Coalescing policy goes one step further and will lazily write stores to the cache and results in a 20% average speedup. The present technique may also be a suitable vehicle for speculative memory optimizations in addition to the nonspeculative ones shown here. Such speculative optimizations include memory ordering violation recovery, dependence prediction, and value speculation.

Although illustrative embodiments of the present technique have been described in detail herein with reference to the accompanying drawings, it is to be understood that the invention is not limited to these precise embodiments, and that various changes and modifications can be made by one skilled in the art without departing from the scope of the invention as defined by the appended claims.

We claim:

1. A data processing apparatus comprising:
   processing circuitry configured to perform data processing;
   a plurality of registers configured to store data for processing by the processing circuitry; and
   a memory rename table configured to store a plurality of memory rename entries, each memory rename entry identifying a mapping between a memory address of a location in a memory and a mapped register of said plurality of registers, the memory rename entry specifying a register number identifying the mapped register;
   wherein the processing circuitry is configured, in response to a store instruction specifying a store target memory address, to store a data value to a store destination register, and to provide a memory rename entry in said memory rename table identifying a mapping between said store target memory address and the store destination register; and
   the processing circuitry is configured, in response to a load instruction specifying a load target memory address, to detect whether the memory rename table comprises a corresponding memory rename entry corresponding to said load target memory address, and if the memory rename table comprises the corresponding memory rename entry, to read a data value from the mapped register identified by the corresponding memory rename entry, write the read data value to a load destination register.

2. The data processing apparatus according to claim 1, wherein in response to the load instruction, if the memory rename table comprises the corresponding memory rename entry, then the processing circuitry is configured to update the corresponding memory rename entry to identify a mapping between the load target memory address and the load destination register.

3. The data processing apparatus according to claim 1, wherein in response to the load instruction, if the memory rename table does not comprise the corresponding memory rename entry, then the processing circuitry is configured to load a data value from the location in memory identified by the load target memory address, write the loaded data value to the load destination register, and allocate a memory rename entry to said memory rename table for identifying a mapping between the load target memory address and the load destination register.

4. The data processing apparatus according to claim 1, wherein in response to the store instruction, the processing circuitry is configured to detect whether the memory rename table comprises a memory rename entry corresponding to said store target memory address;
   if the memory rename table comprises the memory rename entry corresponding to said store target memory address, then the processing circuitry is configured to update the corresponding memory rename entry to identify the mapping between the store target memory address and the store destination register; and
   if the memory rename table does not comprise the memory rename entry corresponding to said store target memory address, then the processing circuitry is configured to allocate a memory rename entry to said memory rename table for identifying the mapping between the store target memory address and the store destination register.

5. The data processing apparatus according to claim 1, wherein in response to a program instruction specifying an architectural register specifier, the processing circuitry is configured to perform a processing operation using data stored in one of said plurality of registers.

6. The data processing apparatus according to claim 1, comprising a plurality of general purpose registers different to said plurality of registers;
   wherein in response to a program instruction specifying an architectural register specifier, the processing circuitry is configured to perform a processing operation using data stored in one of said plurality of general purpose registers.

7. The data processing apparatus according to claim 1, wherein the processing circuitry comprises a register renaming stage configured to map an architectural register specifier specified by an instruction to be processed by the processing circuitry to the register number of one of said plurality of registers.

8. The data processing apparatus according to claim 7, wherein in response to the store instruction, the register renaming stage is configured to allocate one of said plurality of registers as said store destination register for the store instruction.

9. The data processing apparatus according to claim 7, comprising a register rename table configured to store a plurality of register rename entries, each register rename entry identifying a mapping between an architectural register specifier and the register number of one of said plurality of registers.

10. The data processing apparatus according to claim 7, wherein each register is associated with a register bound flag indicating whether the register is currently mapped to an architectural register specifier, and a memory bound flag indicating whether the register is currently mapped to a memory address using one of the memory rename table entries.

11. The data processing apparatus according to claim 10, wherein in response to an instruction specifying an architectural register specifier of a destination register, the register rename stage is configured to map the architectural register specifier to the register number of a register for which the register bound flag indicates that the register is not currently mapped to any architectural register specifier and the memory bound flag indicates that the register is not currently mapped to any memory address.

12. The data processing apparatus according to claim 1, wherein the processing circuitry is configured to perform speculative execution of at least one instruction, and to commit a result of the at least one instruction in response to determining that the speculative execution was correct.

13. The data processing apparatus according to claim 12, wherein the processing circuitry is configured to update the memory rename table in response to the speculative execution of a load or store instruction before the result of the load or store instruction has been committed.

14. The data processing apparatus according to claim 12, wherein the processing circuitry is configured to prohibit eviction of a memory rename table entry corresponding to a speculatively executed load or store instruction until the speculatively executed load or store instruction is committed.

15. The data processing apparatus according to claim 12, wherein the processing circuitry is configured to allow a memory rename table entry identifying a mapping between a target address and a first mapped register, which corresponds to a speculatively executed load or store instruction has not yet been committed, to be overwritten with a mapping between said target address and a second mapped register corresponding to a different load or store instruction.

16. The data processing apparatus according to claim 13, comprising a retirement memory rename table configured to store a plurality of the memory rename entries;
   wherein the processing circuitry is configured to update the retirement memory rename table in response to the result of a load or store instruction being committed.

17. The data processing apparatus according to claim 16, wherein in response to determining that the speculative execution of at least one load or store instruction was incorrect, the processing circuitry is configured to copy at least one memory rename entry from the retirement memory rename table to the memory rename table.

18. The data processing apparatus according to claim 12, wherein the processing circuitry is configured to invalidate a memory rename entry of the memory rename table in response to committing the result of a load or store instruction for which the memory rename entry was allocated to the memory rename table.

19. The data processing apparatus according to claim 18, wherein in response to a load or store instruction for which the memory rename table does not comprise a memory rename entry corresponding to the load target memory address or store target memory address, the processing circuitry is configured to allocate an invalid memory rename entry for the load or store instruction.

20. The data processing apparatus according to claim 19, wherein if the memory rename table does not comprise any invalid memory rename entries, then the processing circuitry is configured to stall processing until a memory rename entry becomes invalid.

21. The data processing apparatus according to claim 12, wherein in response to committing the result of the load or store instruction for which a memory rename entry was allocated to the memory rename table, the processing circuitry is configured to maintain the memory rename entry as valid.

22. The data processing apparatus according to claim 21, wherein each of the plurality of registers has an associated commit flag;
   in response to speculative execution of a load or store instruction, the processing circuitry is configured to set the commit flag associated with the load destination register or the store destination register to a non-committed state; and
   in response to committing the result of a load or store instruction, the processing circuitry is configured to set the commit flag associated with the load destination register or the store destination register to a committed state.

23. The data processing apparatus according to claim 22, wherein in response to a load or store instruction for which the memory rename table does not comprise a memory rename entry corresponding to the load target memory address or store target memory address:
   (i) if the memory rename table comprises an invalid memory rename entry, then the processing circuitry is configured to allocate the invalid memory rename entry for the load or store instruction; and
   (ii) if the memory rename table does not comprise any invalid memory rename entries, then the processing circuitry is configured to select a memory rename entry identifying a mapped register for which the commit flag is in the committed state, and allocate the selected memory rename entry for the load or store instruction.

24. The data processing apparatus according to claim 12, wherein the processing circuitry is configured to store the data value from the store destination register to a location in memory identified by the store target memory address in response to committing the result of the store instruction.

25. The data processing apparatus according to claim 1, wherein in response to the memory rename entry corresponding to the store target memory address being invalidated or allocated for identifying a mapping for a different memory address, the processing circuitry is configured to store the data value from the store destination register to a location in memory identified by the store target memory address.

26. The data processing apparatus according to claim 25, wherein in response to the memory rename entry corresponding to the store target memory address being invalidated or allocated for identifying a mapping for a different memory address, the processing circuitry is configured to inhibit storing the data value from the store destination register to memory if a further store instruction is pending specifying the same store target memory address.

27. The data processing apparatus according to claim 25, wherein in response to the memory rename entry corresponding to the store target memory address being invalidated or allocated for identifying a mapping for a different memory address, the processing circuitry is configured to store the data value from the store destination register to memory if a writeback flag associated with the store destination register is in a first state, and to inhibit storing the data value within the store destination registry to memory if the writeback flag is in a second state.

28. The data processing apparatus according to claim 27, wherein in response to a store instruction, the processing circuitry is configured to set the writeback flag associated with the store destination register to the first state; and
   in response to a store instruction for which the memory rename table comprises a memory rename entry corresponding to the store target memory address, the processing circuitry is configured to set to the second state the writeback flag associated with the mapped register indicated by the memory rename entry corresponding to the store target memory address.

29. The data processing apparatus according to claim 28, wherein in response to a load instruction for which the memory rename table comprises the corresponding memory rename entry corresponding to the load target memory address, the processing circuitry is configured to set the writeback flag associated with the load destination register to the same state as the writeback flag associated with the mapped register identified by the corresponding memory rename entry.

30. The data processing apparatus according to claim 1, wherein the memory rename table has a set-associative structure indexed by the memory address.

31. The data processing apparatus according to claim 30, wherein each memory rename entry specifies a tag portion of the memory address and the register number of the mapped register.

32. The data processing apparatus according to claim 1, comprising issue circuitry configured to control issuing of instructions to the processing circuitry, wherein the issue circuitry is configured to prevent load or store instructions specifying the same target address as a to-be-issued store instruction from being issued ahead of said to-be-issued store instruction.

33. The data processing apparatus according to claim 30, comprising issue circuitry configured to control issuing of instructions to the processing circuitry, wherein the issue circuitry is configured to allow a store instruction to be issued ahead of no more than N earlier store instructions in a program order, where N is the associativity of the memory rename table.

34. The data processing apparatus according to claim 30, comprising issue circuitry configured to control issuing of instructions to the processing circuitry, wherein the issue circuitry is configured to allow a store instruction to be issued ahead of no more than N earlier store instructions in a program order which have a target address corresponding to the same set of the memory rename table as the target address of the store instruction, where N is the associativity of the memory rename table.

35. A data processing apparatus comprising:
   processing means for performing data processing;
   a plurality of register means for storing data for processing by the processing means; and
   memory rename table means for storing a plurality of memory rename entries, each memory rename entry identifying a mapping between a memory address of a location in a memory and a mapped register means of said plurality of register means, the memory rename entry specifying a register number identifying the mapped register means;
   wherein the processing means is configured, in response to a store instruction specifying a store target memory address, to store a data value to a store destination register means, and to provide a memory rename entry in said memory rename table means identifying a mapping between said store target memory address and the store destination register means; and
   the processing means is configured, in response to a load instruction specifying a load target memory address, to detect whether the memory rename table means comprises a corresponding memory rename entry corresponding to said load target memory address, and if the memory rename table means comprises the corresponding memory rename entry, to read a data value from the mapped register means identified by the corresponding memory rename entry, write the read data value to a load destination register means.

36. A method of processing data using a plurality of registers for storing data and a memory rename table configured to store a plurality of memory rename entries, each memory rename entry identifying a mapping between a memory address of a location in a memory and a mapped register of said plurality of registers, the memory rename entry specifying a register number identifying the mapped register;
   the method comprising steps of:
   in response to a store instruction specifying a store target memory address, storing a data value to a store destination register, and providing a memory rename entry in said memory rename table identifying a mapping between said store target memory address and the store destination register; and
   in response to a load instruction specifying a load target memory address, detecting whether the memory rename table comprises a corresponding memory rename entry corresponding to said load target memory address, and if the memory rename table comprises the corresponding memory rename entry, reading a data value from the mapped register identified by the corresponding memory rename entry, writing the read data value to a load destination register.

* * * * *